US009619123B1

United States Patent
Hughes et al.

(10) Patent No.: US 9,619,123 B1
(45) Date of Patent: Apr. 11, 2017

(54) ACQUIRING AND SHARING CONTENT EXTRACTED FROM MEDIA CONTENT

(71) Applicant: Google Inc., Mountain View, CA (US)

(72) Inventors: Joseph Hughes, London (GB); Benedict Davies, London (GB)

(73) Assignee: Google Inc., Mountain View, CA (US)

( * ) Notice: Subject to any disclaimer, the term of this patent is extended or adjusted under 35 U.S.C. 154(b) by 575 days.

(21) Appl. No.: 13/727,534

(22) Filed: Dec. 26, 2012

Related U.S. Application Data

(60) Provisional application No. 61/599,880, filed on Feb. 16, 2012.

(51) Int. Cl.
*G06F 3/0484* (2013.01)

(52) U.S. Cl.
CPC .................. *G06F 3/04842* (2013.01)

(58) Field of Classification Search
None
See application file for complete search history.

(56) References Cited

U.S. PATENT DOCUMENTS

| | | | | |
|---|---|---|---|---|
| 8,527,520 B2 * | 9/2013 | Morton | ............... | G06F 17/3002 707/746 |
| 8,543,934 B1 * | 9/2013 | Thorsander | ........... | G06F 3/0488 715/773 |
| 2005/0033758 A1 * | 2/2005 | Baxter | ............... | G06F 17/30038 |
| 2005/0204309 A1 * | 9/2005 | Szeto | ................. | H04L 12/5845 715/811 |
| 2007/0250901 A1 * | 10/2007 | McIntire | ............ | H04N 7/17318 725/146 |
| 2008/0086754 A1 * | 4/2008 | Chen | ................. | H04L 29/06027 725/105 |
| 2008/0126387 A1 * | 5/2008 | Blinnikka | ............. | G06F 3/0481 |
| 2009/0031232 A1 * | 1/2009 | Brezina | ................. | H04M 15/00 715/764 |
| 2009/0089352 A1 * | 4/2009 | Davis | ..................... | G06Q 10/00 709/201 |
| 2009/0125534 A1 * | 5/2009 | Morton | ............... | G06F 17/3002 |
| 2010/0324902 A1 | 12/2010 | Kurzweil et al. | | |

(Continued)

OTHER PUBLICATIONS

Hassanzadeh, O. & Consens, M. P. (2009), Linked Movie Data Base (Triplification Challenge Report), Workshop on Linked Data on the Web, Apr. 20, 2009, Madrid, Spain.*

*Primary Examiner* — Maryam Ipakchi
(74) *Attorney, Agent, or Firm* — Troutman Sanders LLP; James E. Schutz; Andrew C. Doherty

(57) ABSTRACT

Systems, methods and devices described herein enable acquiring, selecting and sharing content elements, extracted from media content playing on a first device, using one or more second devices. For example, while a video stream is playing on a first client device, a second client device acquires and sends content information derived from the video stream to a server system. The server system identifies the video stream, generates a set of instructions and extracts content elements associated with the media content. The content elements may include, without limitation, individually selectable portions of text, images, suggested ratings, video clips, audio clips, etc. In some implementations, the set of instructions includes instructions to display the one or more content items using non-intersecting overlay regions that enable each respective content element to be individually selectable.

6 Claims, 14 Drawing Sheets

(56) References Cited

U.S. PATENT DOCUMENTS

| | | | |
|---|---|---|---|
| 2011/0231878 A1* | 9/2011 | Hunter | H04N 5/44543 725/48 |
| 2011/0246495 A1* | 10/2011 | Mallinson | G06F 17/30026 707/758 |
| 2011/0247042 A1* | 10/2011 | Mallinson | G06F 17/30026 725/86 |
| 2012/0029917 A1* | 2/2012 | Chang et al. | 704/235 |
| 2012/0117078 A1* | 5/2012 | Morton | G06F 17/3002 707/741 |
| 2012/0209841 A1 | 8/2012 | Saretto et al. | |
| 2012/0272268 A1 | 10/2012 | McCarthy, III | |
| 2013/0103814 A1* | 4/2013 | Carrasco et al. | 709/223 |
| 2013/0182182 A1 | 7/2013 | Mountain | |
| 2014/0089424 A1* | 3/2014 | Oztaskent et al. | 709/206 |
| 2014/0137012 A1* | 5/2014 | Matas | G06F 17/30867 715/764 |
| 2014/0282013 A1* | 9/2014 | Amijee | 715/732 |
| 2015/0026716 A1* | 1/2015 | Mallinson | 725/32 |
| 2015/0143260 A1* | 5/2015 | Bailey | G06Q 50/01 715/753 |

\* cited by examiner

ACQUIRING AND SHARING CONTENT EXTRACTED FROM MEDIA CONTENT

RELATED APPLICATIONS

This application claims the benefit of U.S. Provisional Patent Application No. 61/599,880, filed on Feb. 16, 2012, and which is incorporated by reference herein in its entirety.

TECHNICAL FIELD

The present application describes systems and methods enabling acquiring, selecting and sharing of content extracted from broadcast media content, presented on a first device, using an Internet-enabled second device.

BACKGROUND

Users of Internet-enabled electronic devices, such as computers, tablets and smart phones, are increasingly interested in sharing media viewing and listening experiences with others. Sharing media content is relatively straightforward when the media content is available online (e.g. streaming video, web pages, quotes from scripts, downloadable music or videos) in which case the user can simply send electronic messages with links to the media content of interest. However, it is more difficult for a user to share information about or excerpts from media content as it is being broadcast. For example, if a viewer wants to share a quote from a TV sitcom or movie, that viewer would need to send an email, text, tweet or a social network update, or make one or many calls, to his or her friends with the pertinent quote. It is even harder, if at all possible, for a user to send a friend a link to, or a snippet of, or a quote from media content airing in real-time due to the lack of integration between the airing media content and whatever communication device is employed by the user to share information about the media content.

In other words, it is inefficient for users to share information related to media content they are viewing on TV (or the like) because sharing such information currently requires users to take some action beyond the viewing experience. Returning to the example above, a user attempting to share a quote from a TV sitcom on a social networking website would either have to type the quote or search for the text of the script online in order to locate the quote. Even if the text of the script is available online, selecting text on a touch screen display can be difficult because finger contact on a touch screen display can be imprecise. The task is further frustrated because the hands of a user often obscure the display.

SUMMARY

The aforementioned deficiencies and other problems are reduced or eliminated by the disclosed systems, methods and devices. Various embodiments of systems, methods and devices within the scope of the claims each have several aspects, no single one of which is solely responsible for the desirable attributes described herein. Without limiting the scope of the claims, some prominent features of example implementations are described herein. After considering this description one will understand how the features of various implementations are configured to enable one or more users to acquire, select and share content elements associated with media content presented on a first type of device using respective Internet-enabled second devices.

More specifically, the systems, methods and devices described herein enable acquiring, selecting and sharing content elements, extracted from media content playing on a first device, using one or more second devices. For example, while a video stream is playing on a first client device (e.g. television), a second client device (e.g. a tablet computer or smart phone) acquires and sends content information derived from the video stream to a server system. The server system identifies the video stream playing on the first client device by matching the content information to a content fingerprint. Then, based on the matched fingerprint, the server system generates a set of instructions and extracts content elements associated with the media content. The content elements may include, without limitation, individually selectable portions of text, images, suggested ratings, video clips, audio clips, etc. In some implementations, the set of instructions includes instructions to display the one or more content items using non-intersecting overlay regions that enable each respective content element to be individually selectable. In some implementations, the set of instructions includes indicators that indicate that the one or more content elements (e.g. text blocks) either can be displayed individually using non-intersecting overlay regions that enable each respective content element to be individually selected, or can be displayed as individually selectable groupings including one or more content elements. The instructions are sent to the second client device for execution and the related content elements are sent to the second client device for display. The second client device executes one or more applications in accordance with the set of instructions and displays the related content elements.

In accordance with some implementations, systems and methods are provided to display content elements on a second client device that is related to a video stream playing on a first client device. The second client device generates a reference to the video stream playing on the first client device, and transmits the reference to a server system. The reference is received from the second client device at the server system. The content information is derived from the reference to the video stream playing on the first client device. The content information is matched to a content fingerprint. A set of instructions and content elements are determined based on the content fingerprint and the set of instructions and content elements are sent to a second client device for execution.

In accordance with some implementations, a set of instructions is received at a second client device. The set of instructions include instructions to display content elements related to the video playing on a first client device. One or more applications are executed in accordance with the set of instructions. The one or more applications display the information related to the content playing on the first client device.

Some implementations include a method of retrieving and displaying individually selectable content elements on a first device including a processor, memory and a display. In some implementations, the method includes: referencing a portion of media content; transmitting the reference to the portion of the media content to an information extraction module; receiving from the information extraction module one or more content elements associated with the referenced portion of the media content; and displaying the one or more content elements on the display in combination with a corresponding one or more non-intersecting overlay regions, each of the respective overlay regions enabling a respective content element to be individually selectable.

In some implementations, each content element includes at least one of a text segment, an image, a sound clip and a video clip. In some implementations, the content information module includes a server. In some implementations, the first device further includes the content information module.

In some implementations, referencing the portion of the media content includes recording the referenced portion of the media content from media content playing to a user. In some implementations, the recorded portion of the media content includes at least one of audio components and image components. In some implementations, the media content is playing on a second device separate from the first device. In some implementations, the second device includes at least one of a television, a computer, a video display system, a radio and an audio system. In some implementations, the media content is playing on the first device.

In some implementations, the display includes a touch-screen display, and the method further includes enabling user interaction with the touch-screen display to allow a user to individually select a respective content element by touching a portion of the touch-screen display displaying both the respective content element and the corresponding overlay region. In some implementations, the method also includes: sensing a touch on a particular portion of the touch-screen display; selecting a particular displayed content element associated with the corresponding contacted overlay region displayed on the particular portion of the touch-screen display in response to sensing the user touch; and indicating that a respective content elements has been selected. In some implementations, indicating that the respective content element has been selected includes changing appearance of at least one of the corresponding overlay region and the content element. In some implementations, the method also includes: in response to the sensing of a user contact with the touch-screen display in association with an overlay region, when the appearance of the overlay region shows that the respective displayed content element is selected, toggling the appearance of the overlay region to show that the respective displayed content element is no longer selected.

In some implementations, the at least one overlay region is at least one of visually the same as the background against which the one or more content elements are displayed; and visually different as compared to the background against which the one or more content elements are displayed.

In some implementations, the method also includes: receiving a user input indicating the user wants to retrieve one or more content elements from the media content; and receiving a user input indicating that the user wants to utilize at least one of the one or more content elements. In some implementations, the user input indicates that the user wants to utilize at least one of the one or more content elements including a share request associated with a social networking service, and the method also includes transmitting the share request to a server posting at least one of the one or more content elements selected by the user. In some implementations, the method also includes: receiving a second share request from a user of the first device; transmitting the second share request to the server, the second share request including the selected respective displayed content element; receiving a second user request to share the user selection with a friend using a medium selected from one or more of: a text, an instant message, a phone call, an email, or a social network message; and transmitting the second user request to the server, such that the server sends a message to the friend from the user including the user selection and meta-information for the particular live media program.

In some implementations, each of one or more text segments includes content elements including at least one of a word, a phrase or a sentence. In some implementations, superimposing includes: displaying a single text segment on a plurality of display lines; and displaying a continuance indicator as part of the respective overlay to indicate that the text segment runs across the plurality of display lines. In some implementations, the first device includes a controller for a media playback device. In some implementations, the media playback device includes at least one of a television, a set top box or a game console. In some implementations, the touch-screen device includes a mobile telephone, an Internet-connected laptop computer, or an Internet-connected tablet computer.

In some implementations, the method also includes: recording an audio soundtrack of the live media program; and sending audio content to the information extraction module derived from the recorded audio soundtrack to enable the information extraction module to determine from among a plurality of live media program transmissions the particular live media program by matching the received audio content to audio soundtracks of the live media program transmissions. In some implementations, the method also includes repeating the recording and sending operations so as to have multiple samples of the particular live media program.

Some implementations include a non-transitory computer readable storage medium storing at least one program configured for execution by at least one processor of a computer system including at least one processor, memory and a display. In some implementations, the at least one program includes instructions that when executed cause the computer system to: reference a portion of media content; transmit the reference to the portion of the media content to an information extraction module; receive from the information extraction module one or more content elements associated with the referenced portion of the media content; and display the one or more content elements on the display in combination with a corresponding one or more non-intersecting overlay regions, each of the respective overlay regions enabling a respective content element to be individually selectable.

Some implementations include a method for providing selectable content performed on a device including a processor and memory storing programs for execution on the device. In some implementations, the method includes: retrieving a referenced portion of media content from a user interface module; extracting one or more content elements associated with the referenced portion of the media content, wherein the one or more content elements are distinguishable from one another; and transmitting the one or more content elements to the user interface module.

In some implementations, each content element includes at least one of a text segment, an image, a sound clip and a video clip. In some implementations, the method also includes: transmitting a corresponding one or more indicators along with the one or more content elements, wherein the corresponding one or more indicators instruct the user interface module to display the one or more content elements in combination with a respective one or more non-intersecting overlay regions, each of the respective overlay regions enabling a respective content element to be individually selectable.

In some implementations, extracting the one or more content elements associated with the media content includes applying at least one of an audio recognition technique, an optical character recognition technique and an imaging technique on a portion of the media content.

In some implementations, extracting one or more text segments having a respective content element associated with the media content includes: retrieving close caption information associated with the referenced portion of the media content; and identifying the one or more text segments within the close caption stream associated with the referenced portion of the media content.

In some implementations, the method also includes receiving a first share request from a user interface module, wherein the first share request is associated with a portion of media content playing to a user. In some implementations, the method also includes: identifying an image associated with the referenced portion of the media content; and sending the image to the user interface module.

In some implementations, the method also includes: receiving audio content from the user interface module, wherein the audio content is recorded by the user interface module from an audio soundtrack of media content; receiving a plurality of media content transmissions, the media content transmissions including the particular portion of media content recorded by the user interface module; and determining from among the plurality of media content transmissions the particular media content by matching the received audio content to audio soundtracks of the media content transmissions.

In some implementations, the audio content includes audio snippets from the audio soundtrack or fingerprints from the audio soundtrack. In some implementations, the method also includes repeating the receiving and determining operations so as to have multiple samples of the media content. In some implementations, the method also includes receiving a user selection of one of the one more text segments associated with the media content; receiving a second user request to share the user selection with a friend using a medium selected from one or more of: a text, an instant message, a phone call, an email, or a social network message; and, in response to receiving the second request, sending a message to the friend from the user including the user selection and meta-information for the particular media content.

In some implementations, extracting the one or more text segments includes: determining in the close caption information for the media content meaningful groups of text proximate in time to a particular time to the referenced portion of the media content, wherein each of the groups of text is long enough to be individually selected by touch on a touch screen display; and identifying the meaningful groups as the one or more text segments.

Some implementations include a non-transitory computer readable storage medium storing at least one program configured for execution by at least one processor of a computer system including at least one processor, memory and a display. In some implementations, the at least one program includes instructions that when executed cause the computer system to: retrieve a referenced portion of media content from a user interface module; extract one or more content elements associated with the referenced portion of the media content, wherein the one or more content elements are distinguishable from one another; and transmit the one or more content elements to the user interface module.

Some implementations include a server system configured to provide selectable content elements from media content. In some implementations, the serve system includes at least one processor; memory; and at least one program stored in the memory and executable by the at least one processor, the at least one program including instructions to: retrieve a referenced portion of media content from a user interface module; extract one or more content elements associated with the referenced portion of the media content, wherein the one or more content elements are distinguishable from one another; and transmit the one or more content elements to the user interface module.

DETAILED DESCRIPTION

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other effective aspects.

Figure 1:
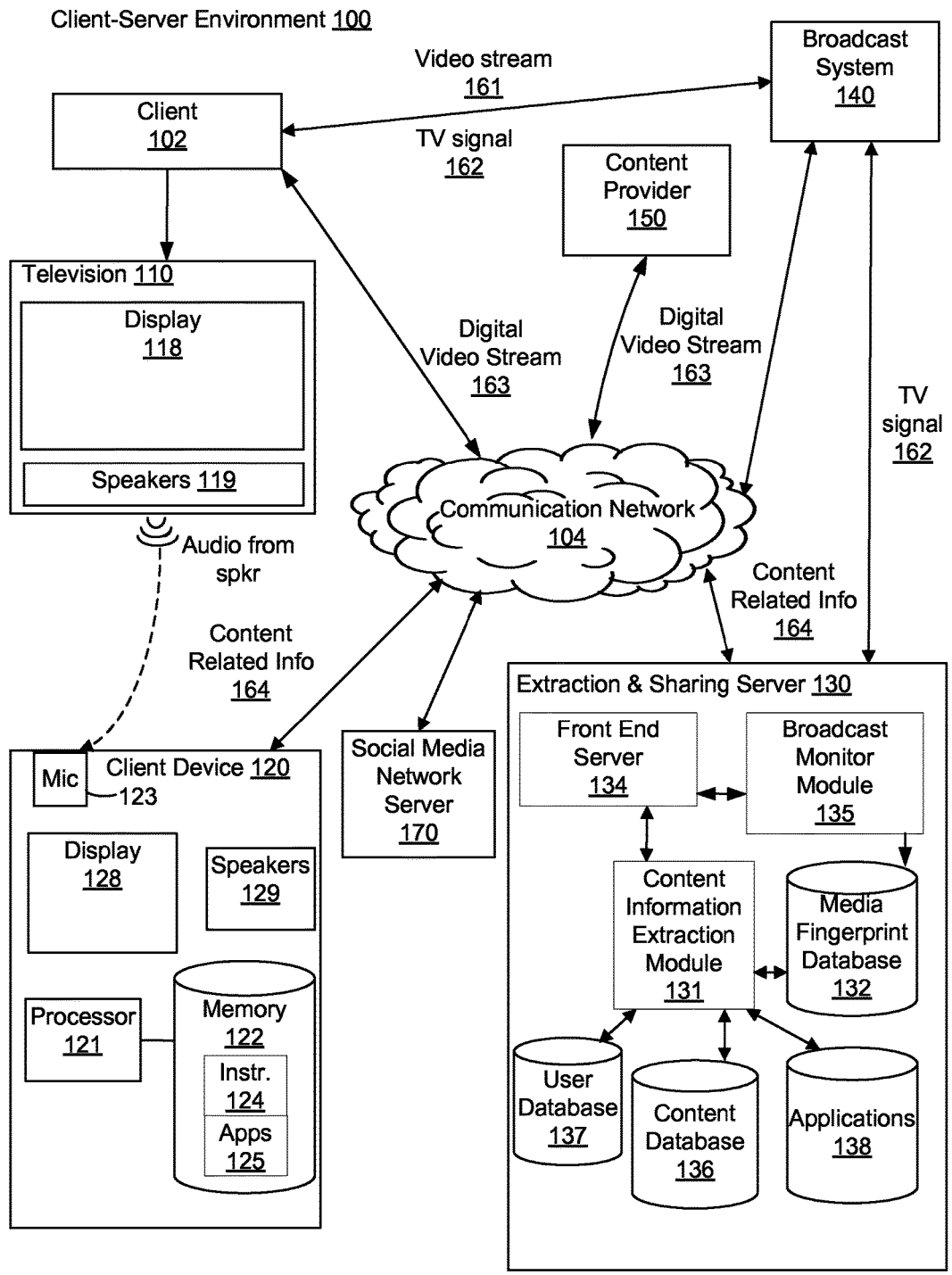
FIG. 1 is a block diagram of a client-server environment according to some implementations.

In accordance with common practice the various features illustrated in the drawings may not be drawn to scale. As such, the dimensions of the various features may be arbitrarily expanded or reduced for clarity. In addition, some of the drawings may not depict all of the components of a given system, method or device. Finally, like reference numerals are used to denote like features throughout the specification and drawings.

DETAILED DESCRIPTION

Reference will now be made to various implementations, examples of which are illustrated in the accompanying drawings. In the following description, numerous specific details are set forth in order to provide a thorough understanding of various aspects of the implementations. However, the invention may be practiced without these specific details. Additionally, well-known methods, procedures, components, and circuits have not been described in exhaustive detail so as not to unnecessarily obscure aspects of the disclosed implementations.

Systems, methods and devices described herein enable acquiring, selecting and sharing content elements, extracted from media content playing on a first device, using one or more second devices. For example, while a video stream is playing on a first client device, a second client device acquires and sends content information derived from the video stream to a server system. The server system identifies the video stream, generates a set of instructions and extracts content elements associated with the media content. The content elements may include, without limitation, individually selectable portions of text, images, suggested ratings, video clips, audio clips, etc. In some implementations, the set of instructions includes instructions to display the one or more content items using non-intersecting overlay regions that enable each respective content element to be individually selectable.

FIG. 1 is a block diagram of a simplified example client-server environment 100 according to some implementations. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes an optional client device 102, a television (TV) 110, a second screen client device 120, a communication network 104, an extraction and sharing server 130, a broadcast system 140, a content provider 150, and a social media network server 170. The client device 102, the second screen client device 120, the extraction and sharing server 130, the broadcast system 140, the content provider 150, and the social media network server 170 are capable of being connected to the communication network 104 in order to exchange information with one another and/or other devices and systems.

In some implementations, the extraction and sharing server 130 is implemented as a single server system, while in other implementations it is implemented as a distributed system of multiple servers. Solely for convenience of explanation, the extraction and sharing server 130 is described below as being implemented on a single server system. Similarly, in some implementations, the broadcast system 140 is implemented as a single server system, while in other implementations it is implemented as a distributed system of multiple servers. Solely, for convenience of explanation, the broadcast system 140 is described below as being implemented on a single server system. Similarly, in some implementations, the content provider 150 is implemented as a single server system, while in other implementations it is implemented as a distributed system of multiple servers. Solely, for convenience of explanation, the content provider 150 is described below as being implemented on a single server system. Moreover, the functionality of the broadcast system 140 and the content provider 150 can be combined into a single server system. Additionally and/or alternatively, while only one broadcast system and only one content provider is illustrated in FIG. 1 for the sake of brevity, those skilled in the art will appreciate from the present disclosure that fewer or more of each may be present in an implementation of a client-server environment.

The communication network 104 may be any combination of wired and wireless local area network (LAN) and/or wide area network (WAN), such as an intranet, an extranet, including a portion of the Internet. It is sufficient that the communication network 104 provides communication capability between the second screen client device 120 and the extraction and sharing server 130. In some implementations, the communication network 104 uses the HyperText Transport Protocol (HTTP) to transport information using the Transmission Control Protocol/Internet Protocol (TCP/IP). HTTP permits client devices 102 and 120 to access various resources available via the communication network 104. However, the various implementations described herein are not limited to the use of any particular protocol.

In some implementations, the extraction and sharing server 130 includes a front end server 134 that facilitates communication between the extraction and sharing server 130 and the communication network 104. The front end server 134 receives content information 164 from the second screen client device 120. As described in greater detail below with reference to FIGS. 3A-4B, in some implementations, the content information 164 is a video stream, a portion thereof, and/or a reference to a portion thereof, blocks of text, audio, images, etc. A reference to a portion of a video stream may include a time indicator and/or a digital marker referencing the content of the video stream. In some implementations, the content information 164 is derived from a video stream being presented (i.e. playing) by the combination of the TV 110 and the client 102.

In some implementations, the front end server 134 is configured to send a set of instructions to the second screen client device 120. In some implementations, the front end server 134 is configured to send content files and/or links to content files. The term "content file" includes any document or content of any format including, but not limited to, a video file, an image file, a music file, a web page, an email message, an SMS message, a content feed, an advertisement, a coupon, a playlist or an XML document. In some implementations, the front end server 134 is configured to send or receive one or more video streams. In some implementations, the front end server 134 is configured to receive content directly from the broadcast system 140 and/or the content provider 150 over the communication network 104, and relay that content to the broadcast monitor module 135. In some implementations, broadcast monitor module 135 has a dedicated link to at least one of the broadcast system 140 and/or the content provider 150.

According to some implementations, a video or video stream is a sequence of images or frames representing scenes in motion. A video can be distinguished from an image. A video displays a number of images or frames per second. For example, a video displays thirty or sixty consecutive image frames per second. In contrast, an image is not necessarily associated with any other images.

A content feed (or channel) is a resource or service that provides a list of content items that are present, recently added, or recently updated at a feed source. A content item in a content feed may include the content associated with the item itself (the actual content that the content item specifies), a title (sometimes called a headline), and/or a description of the content, a network location or locator (e.g., URL) of the content, or any combination thereof. For example, if the content item identifies a text article, the content item may include the article itself inline, along with the title (or headline), and locator. Alternatively, a content item may include the title, description and locator, but not the article content. Thus, some content items may include the content associated with those items, while others contain links to the associated content but not the full content of the items. A content item may also include additional meta data that provides additional information about the content. For example, the meta data may include a time-stamp or embedded selectable website links. The full version of the content may be any machine-readable data, including but not limited to web pages, images, digital audio, digital video, Portable Document Format (PDF) documents, and so forth.

In some implementations, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other implementations, other content syndication formats, such as the Atom syndication format or the VCALENDAR calendar format, may be used to specify content feeds.

In some implementations, the extraction and sharing server 130 is configured to receive content information 164 from the second screen client device 120, match the content information to a content fingerprint in the fingerprint database 132, generate a set of instructions and one or more content elements based on the matched fingerprint and send the set of instructions and the one or more content elements to the second screen client device 120 for execution, display, and/or selection and/or sharing. To that end, as described in greater detail below, in some implementations the extraction and sharing server 130 includes a content information extraction module 131 that is configured to operate with the front end server 134 and the other components of the extraction and sharing server 130 to identify (i.e. fingerprint) the playing media content and provide content elements associated with about the playing media content. In some implementations, the content information extraction module 131 is a distributed network of elements. In some implementations, the content elements may include, without limitation, any combination of individually selectable portions of text, images, suggested ratings, video clips, audio clips, etc.

In some implementations, the extraction and sharing server 130 includes a user database 137 that stores user data. In some implementations, the user database 137 is a distributed database. In some implementations, the extraction and sharing server 130 includes a content database 136. In some implementations, the content database 136 includes text, advertisements, videos, images, music, web pages, email messages, SMS messages, content feeds, advertisements, coupons, playlists, XML documents, and ratings associated with various media content or any combination thereof. In some implementations, the content database 136 includes links to text, advertisements, videos, images, music, web pages, email messages, SMS messages, content feeds, advertisements, coupons, playlists, XML documents and ratings associated with various media content. In some implementations, the content database 136 is a distributed database.

As noted above, in some implementations, the extraction and sharing server 130 includes a fingerprint database 132 that stores content fingerprints. A content fingerprint includes any type of condensed or compact representation, or signature, of the content of a video stream and/or audio stream. In some implementations, a fingerprint may represent a clip (such as several seconds, minutes, or hours) of a video stream or audio stream. Or, a fingerprint may represent a single instant of a video stream or audio stream (e.g., a fingerprint of single frame of a video or of the audio associated with that frame of video). Furthermore, since video content may changes over time, corresponding fingerprints of that video content may also change over time. In some implementations, the fingerprint database 132 is a distributed database.

In some implementations, the extraction and sharing server 130 includes a broadcast monitor module 135 that is configured to create fingerprints of media content broadcast by the broadcast system 140 and/or the content provider 150.

In some implementations, the optional client device 102 is provided in combination with a display device such as a TV 110. The client device 102 is configured to receive a video stream 161 from the broadcast system 140 and pass the video stream to the TV 110 for display. While a TV has been used in the illustrated example, those skilled in the art will appreciate from the present disclosure that any number of displays devices, including computers, laptop computers, tablet computers, smart-phones and the like, can be used to display a video stream. Additionally and/or alternatively, the functions of the client 102 and the TV 110 may be combined into a single device. Additionally and/or alternatively, in some implementations the TV 110 can be configured to receive and display signals without using the client device 102 or the like.

In some implementations, the client device 102 is any suitable computer device capable of connecting to the communication network 104, receiving video streams, extracting information from video streams and presenting video streams for the display using the TV 110 (or another display device). In some implementations, the client device 102 is a set top box that includes components to receive and present video streams. For example, the client device 102 can be a set top box for receiving cable TV and/or satellite TV, a digital video recorder (DVR), a digital media receiver, a TV tuner, a computer, and/or any other device that outputs TV signals. In some implementations, the client device 102 displays a video stream on the TV 110. In some implementations the TV 110 can be a conventional TV display that is not connectable to the Internet and that displays digital and/or analog TV content received via over the air broadcasts or a satellite or cable connection.

As is typical of televisions, the TV 110 includes a display 118 and speakers 119. Additionally and/or alternatively, the TV 110 can be replaced with another type of display device 108 for presenting video content to a user. For example, the display device may be a computer monitor that is configured to receive and display audio and video signals or other digital content from the client 102. In some implementations, the display device is an electronic device with a central processing unit, memory and a display that is configured to receive and display audio and video signals or other digital content form the client 102. For example, the display device can be a LCD screen, a tablet device, a mobile telephone, a projector, or other type of video display system. The display device can be coupled to the client 102 via a wireless or wired connection.

In some implementations, the client device 102 receives video streams 161 via a TV signal 162. As used herein, a TV signal is an electrical, optical, or other type of data transmitting medium that includes audio and/or video components corresponding to a TV channel. In some implementations, the TV signal 162 is a terrestrial over-the-air TV broadcast signal or a sign distributed/broadcast on a cable-system or a satellite system. In some implementations, the TV signal 162 is transmitted as data over a network connection. For example, the client device 102 can receive video streams from an Internet connection. Audio and video components of a TV signal are sometimes referred to herein as audio signals and video signals. In some implementations, a TV signal corresponds to a TV channel that is being displayed on the TV 110.

In some implementations, a TV signal 162 carries information for audible sound corresponding to an audio track on a TV channel. In some implementations, the audible sound is produced by the speakers 119 included with the TV 110.

The second screen client device 120 may be any suitable computer device that is capable of connecting to the communication network 104, such as a computer, a laptop computer, a tablet device, a netbook, an internet kiosk, a personal digital assistant, a mobile phone, a gaming device, or any other device that is capable of communicating with the extraction and sharing server 130. In some implementations, the second screen client device 120 includes one or more processors 121, non-volatile memory 122 such as a hard disk drive, a display 128, speakers 129, and a microphone 123. The second screen client device 120 may also have input devices such as a keyboard, a mouse and/or track-pad (not shown). In some implementations, the second screen client device 120 includes a touch screen display, a digital camera and/or any number of supplemental devices to add functionality.

In some implementations, the second screen client device 120 is connected to and/or includes a display device 128. The display device 128 can be any display for presenting video content to a user. In some implementations, the display device 128 is the display of a television, or a computer monitor, that is configured to receive and display audio and video signals or other digital content from the second screen client device 120. In some implementations, the display device 128 is an electronic device with a central processing unit 121, memory 122 and a display that is configured to receive and display audio and video signals or other digital content. In some implementations, the display device 128 is a LCD screen, a tablet device, a mobile telephone, a projector, or any other type of video display system. In some implementations, the second screen client device 120 is connected to and/or integrated with the display device 128. In some implementations, the display device 128 includes, or is otherwise connected to, speakers capable of producing an audible stream corresponding to the audio component of a TV signal or video stream.

In some implementations, the second screen client device 120 is connected to the client device 102 via a wireless or wired connection 103. In some implementations where such connection exists, the second screen client device 120 may optionally operate in accordance with instructions, information and/or digital content (collectively "second screen information") provided by the client device 102. In some implementations, the client device 102 issues instructions to the second screen client device 120 that cause the second screen client device 120 to present on the display 128 and/or the speaker 129 digital content that is complementary, or related to, digital content that is being presented by the client 102 on the TV 110.

In some implementations, the second screen client device 120 includes a microphone 123 that enables the client device to receive sound (audio content) from, for example, the speakers 119 of the TV 110. The microphone 123 enables the second screen client device 120 to store the audio content/soundtrack that is associated with the video content as it is presented. The second screen client device 120 can store this information locally and then send to the extraction and sharing server 130 content information 164 that is any one or more of: fingerprints of the stored audio content, the audio content itself, portions/snippets of the audio content, fingerprints of the portions of the audio content or references to the playing content.

In this way, the extraction and sharing server 130 can identify the content playing on the television even if the electronic device on which the content is being presented is not an Internet-enabled device, such as an older TV set; is not connected to the Internet (temporarily or permanently) so is unable to send the content information 164; or does not have the capability to record or fingerprint media information related to the video content. Such an arrangement (i.e., where the second screen client device 120 stores and sends the content information 164 to the extraction and sharing server 130) allows a user to receive from the extraction and sharing server 130 second screen content triggered in response to the content information 164 no matter where the user is watching TV.

In some implementations, the second screen client device 120 includes one or more applications 125 stored in the memory 122. As discussed in greater detail below, the processor 121 executes the one or more applications in accordance with a set of instructions received from the extraction and sharing server 130.

Figure 2:
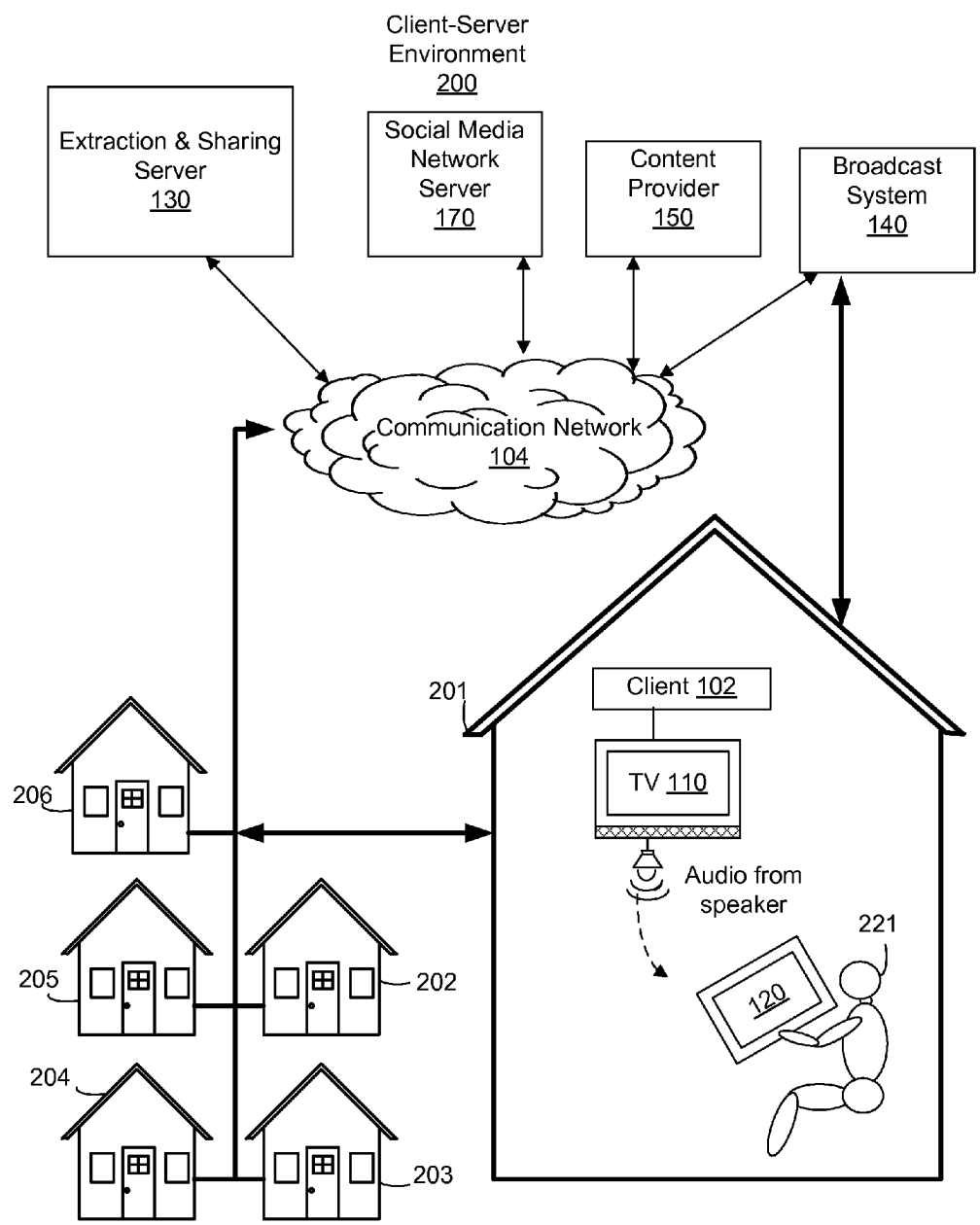
FIG. 2 is a block diagram of a client-server environment according to some implementations.

FIG. 2 is a block diagram of a client-server environment 200 according to some implementations. The client-server environment 200 illustrated in FIG. 2 is similar to and adapted from the client-server environment 100 illustrated in FIG. 1. Elements common to both share common reference indicia, and only the differences between the client-server environments 100, 200 are described herein for the sake of brevity.

As a non-limiting example, within the client-server environment 200, the client 102, the TV 110 (or similarly configured computing device) and second screen client device 120 are included in a first residential location 201. In operation, the client device 102 receives a TV signal or some other type of streaming or downloadable video signal or audio signal. The client device 102 then communicates at least a portion of the received signal to the TV 110 for display to the user 221. As described above, the second screen client device 120 is configured to detect the media content playing on the first device (e.g. TV 110) and enable acquisition, selection, and sharing of content elements associated with the media content playing on the TV 110 through communication with the extraction and sharing server 130. Similar arrangements may be found within residential locations 202, 203, 204, 205 and 206, in which other users (not shown) similarly equipped can acquire, select and share content elements associated with the same media content. Moreover, while residential locations have been used in this particular example, those skilled in the art will appreciate from the present disclosure that client devices and the like can be located in any type of location, including commercial, residential and public locations. More specific details pertaining to how content elements are shared amongst users are described below with reference to the remaining drawings and continued reference to FIGS. 1 and 2.

Figure 3A:
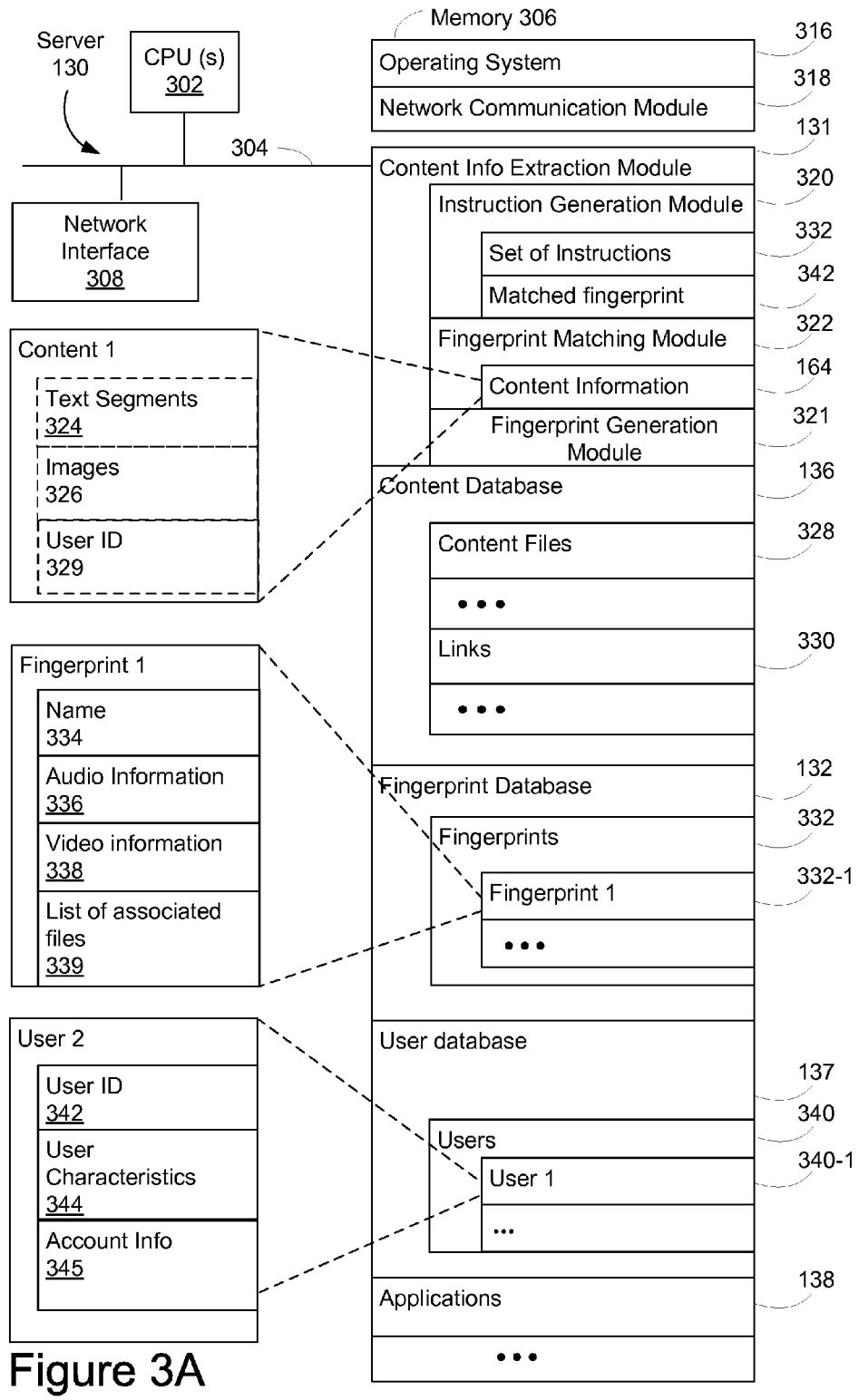
FIG. 3A is a block diagram of a configuration of a server system according to some implementations.

FIG. 3A is a block diagram of a configuration of the extraction and sharing server 130 according to some implementations. In some implementations, the extraction and sharing server 130 includes one or more processing units (CPU's) 302, one or more network or other communications interfaces 308, memory 306, and one or more communication buses 304 for interconnecting these and various other components. The communication buses 304 optionally include circuitry (sometimes called a chipset) that interconnects and controls communications between system components. The memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302. The memory 306, including the non-volatile and volatile memory device(s) within the memory 306, includes a non-transitory computer readable storage medium. In some implementations, the memory 306 or the non-transitory computer readable storage medium of the memory 306 stores the following programs, modules and data structures, or a subset thereof including an operation system 316, a network communication module 318, a content information extract module 131, a content database 136, a fingerprint database 132, a user database 137, and applications 138.

The operating system 316 includes procedures for handling various basic system services and for performing hardware dependent tasks.

The network communication module 318 facilitates communication with other devices via the one or more communication network interfaces 308 (wired or wireless) and one or more communication networks, such as the Internet, other wide area networks, local area networks, metropolitan area networks, and so on. With further reference to FIG. 1, the network communication module 318 may be incorporated into the front end server 134.

The content database 136 includes content files 328 and/or links to content files 230. In some implementations, the content database 136 stores text, advertisements, videos, images, music, web pages, email messages, SMS messages, a content feeds, coupons, playlists, XML documents and any combination thereof. In some implementations, the content database 1376 includes links to text, advertisements, videos, images, music, web pages, email messages, SMS messages, content feeds, coupons, playlists, XML documents and any combination thereof. Content files 328 are discussed in more detail in the discussion of FIG. 3B.

The user database 137 includes user data 340 for one or more users. In some implementations, the user data for a respective user 340-1 includes a user identifier 342, user characteristics 344, and user account information 345. The user identifier 342 identifies a user. For example, the user identifier 342 can be an IP address associated with a client device 102 or an alphanumeric value chosen by the user or assigned by the server that uniquely identifies the user. The user characteristics 344 include the characteristics of the respective user. The user characteristics may include may be one or more of the group consisting of age, gender, income, geographic location, education, wealth, religion, race, ethic group, marital status, household size, employment status, and political party affiliation.

The fingerprint database 132 stores one or more content fingerprints 332. A fingerprint 332 includes a name 334, fingerprint audio information 336 and/or fingerprint video information 338, and a list of associated files 339. The name 334 identifies the respective content fingerprint 332. For example, the name 334 could include the name of an associated television program, movie, or advertisement. In some implementations, the fingerprint audio information 336 includes a fingerprint or other compressed representation of a clip (such as several seconds, minutes, or hours) of the audio content of a video stream or an audio stream. In some implementations, the fingerprint video information 338 includes a fingerprint of a clip (such as several seconds, minutes, or hours) of a video stream. Fingerprints 332 in the fingerprint database 132 are periodically updated.

The content information extraction module 131 receives content information 164 from the second screen client device 120, generates a set of instructions 132 and sends a set of instructions 132 to the second screen client device 120. Additionally and/or alternatively, the extraction and sharing server 130 can receive content information 164 from the client device 102. The content information extraction module 131 includes an instruction generation module 320 and a fingerprint matching module 222. In some implementations, the content information extraction module 131 also includes a fingerprint generation module 321, which generates fingerprints from the content information 164 or other media content saved by the server 130.

The fingerprint matching module 322 matches at least a portion of the content information 164 (or a fingerprint of the content information 164 generated by the fingerprint generation module) to a fingerprint 332 in the fingerprint database 132. The matched fingerprint 342 is sent to the instruction generation module 320. The fingerprint matching module 322 includes content information 164 received from at least one of the client device 102 and the second screen client device 120. The content information 164 includes, for example, individual text segments 324 (e.g. phrases, sentences, paragraphs), images 326 and a user identifier 329. The user identifier 329 identifiers a user associated with at least one of the client device 102 and the second screen client device 120. For example, the user identifier 329 can be an IP address associated with a client device 102 (or 120) or an alphanumeric value chosen by the user or assigned by the server that uniquely identifies the user. In some implementations, the individual text segments 324 includes one or more individually discernable text segments (e.g. phrases, sentences, paragraphs) associated with a video stream or audio stream that was presented on the client device 102, such as excerpts from a TV sitcom or movie script, or the closed caption data. In some implementations, the images 326 include at least one still image or a clip (such as several seconds, minutes, or hours) associated with a video stream that was played on the client device 102.

The instruction generation module 320 generates a set of instructions 332 based on the matched fingerprint 342. In some implementations, the instruction generation module 320 generates the set of instructions 332 based on information associated with the matched fingerprint 342 and the user data 340 corresponding to the user identifier 329. In some implementations, the instruction generation module 320 determines one or more applications 138 associated with the matched fingerprint 342 to send to the second screen client device 120. In some implementations, the instruction generation module 320 determines one or more content files 328 based on the matched fingerprint 342 and sends the determined content files 328 to the second screen client device 320.

In some implementations, the set of instructions 332 includes instructions to execute and/or display one or more applications on the second screen client device 120. For example, when executed by the second screen client device 120, the set of instructions 332 may cause the second screen client device 120 to display an application that was minimized or running as a background process, or the set of instructions 132 may cause the second screen client device 120 to execute the application. In some implementations, the set of instructions 332 include instructions that cause the second screen client device 120 to download one or more content files 328 from the server system 106.

The applications 138 include one or more applications that can be executed on the second screen client device 120.

In some implementations, the applications include a media application, a feed reader application, a browser application, an advertisement application, a coupon book application and a custom application.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., trigger module 118) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3A shows a rating server, FIG. 3A is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 316 and network communication module 318) shown separately in FIG. 3A could be implemented on single servers and single items could be implemented by one or more servers. The actual number of servers used to implement the extraction and sharing server 130 and how features are allocated among them will vary from one implementation to another, and may depend in part on the amount of data traffic that the system must handle during peak usage periods as well as during average usage periods.

Figure 3B:
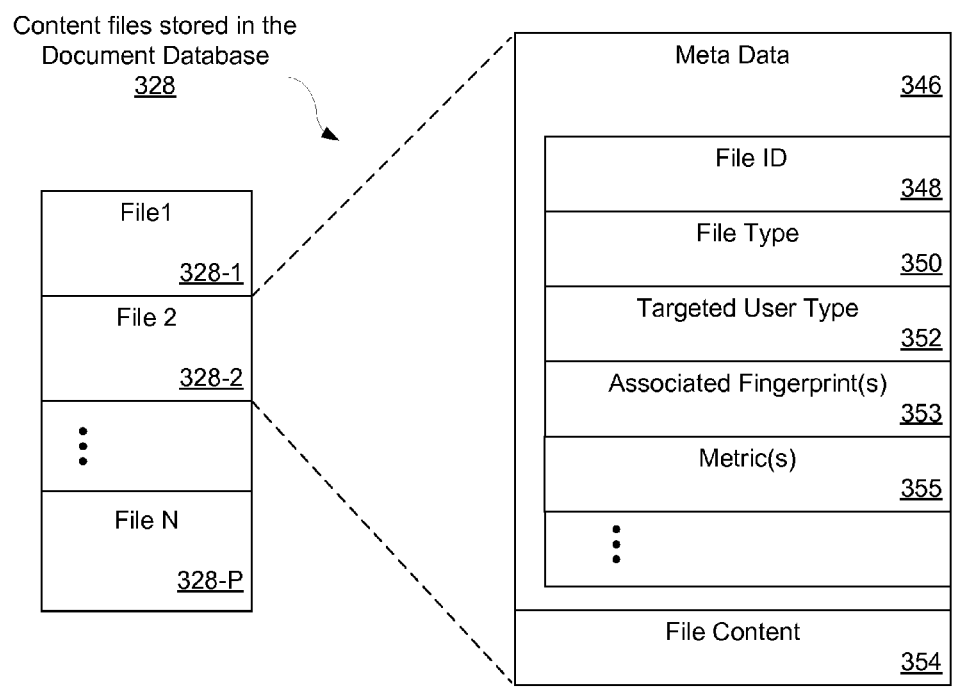
FIG. 3B is a block diagram of a data structure according to some implementations.

FIG. 3B is a block diagram of an example of content file data structures 328 stored in the content database 136, according to some implementations. A respective content file 328 includes meta data 346 and content 354. The meta data 346 for a respective content file 328 includes a content file identifier (file ID) 348, a content file type 250, targeted user type 352, one or more associated fingerprints 353, metrics 355 and optionally, additional information. In some implementations, the file ID 348 uniquely identifies a respective content file 328. In other implementations, the file ID 348 uniquely identifies a respective content file 328 in a directory (e.g., a file director) or other collection of documents within the content database 136. The file type 350 identifies the type of the content file 328. For example, the file type 350 for a respective content file 328 in the content database 136 indicates that the respective content file 328 is a video file, an image file, a music file, a web page, an email message, an SMS message, a content feed, an advertisement, a coupon, a playlist and an XML document. The associated fingerprint 353 identifies one or more fingerprints in the fingerprint database 136 that are associated with the respective content file 328. In some implementations, the associated fingerprints for a respective content file are determined by a broadcaster or creator of the document. In some implementations, the associated fingerprints are extracted by a module associated with the extraction and sharing server 130 or a third party device/system. The targeted user type 352 data represents the document provider's targeted user type for the content file 328. The target user characteristics data represents the population of users, with particular user characteristics, that the document provider wishes to target with the file. The characteristics may be one or more of: age, gender, income, geographic location, education, wealth, religion, race, ethic group, marital status, household size, employment status, and political party affiliation. The target user characteristics data may be represented in absolute terms (e.g., "females between 18 and 25 years in age") or, in some implementations, probabilistically (e.g., "84% male, 16% female, 5% 0-10 years old, 15% 11 to 20 years in age, 80% 20 to 45 years in age"). The metrics 355 provide a measure of the importance of a file 328. In some implementations, the metrics 355 are set by the creator or owner of the document. In some implementations, the metrics 355 represent popularity, number of views or a bid. In some implementations, multiple parties associate files with a content fingerprint and each party places a bid to have their file displayed when content corresponding to the content fingerprint is detected. In some implementations, the metrics 355 include a click through-rate. For example, a webpage may be associated with a content fingerprint.

Figure 4A:
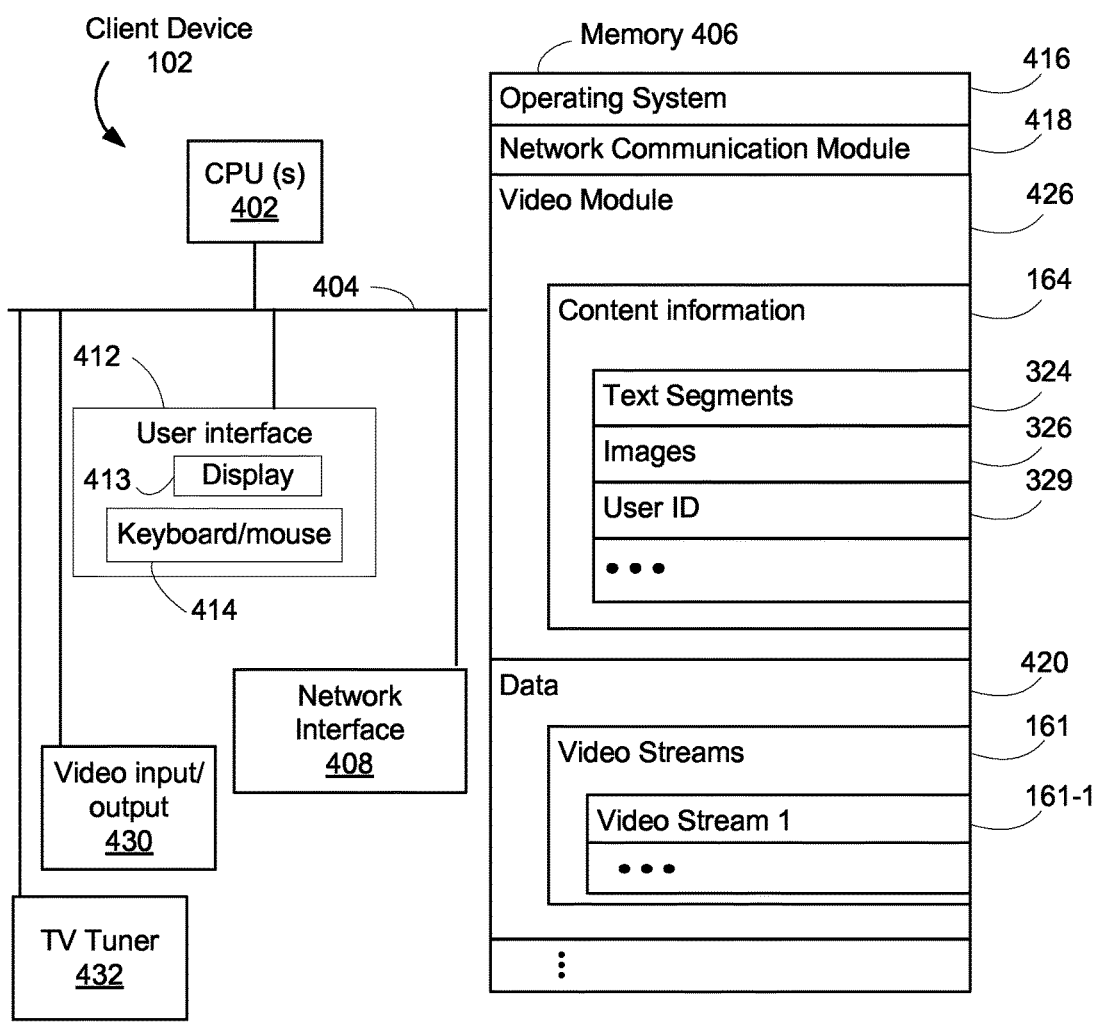
FIG. 4A is a block diagram of a configuration of a client device according to some implementations.

FIG. 4A is a block diagram of a configuration of the client device 102 according to some implementations. The client device 102 typically includes one or more processing units (CPU's) 402, one or more network or other communications interfaces 408, memory 406, and one or more communication buses 404, for interconnecting these and various other components. The communication buses 404 optionally include circuitry (sometimes called a chipset) that interconnects and controls communications between system components. The client device 102 may also include a user interface comprising a display device 413 and a keyboard and/or mouse (or other pointing device) 414 and/or a remote control (etc.). Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternatively the non-volatile memory device(s) within memory 406, comprises a non-transitory computer readable storage medium. In some implementations, memory 406 or the computer readable storage medium of memory 306 store the following programs, modules and data structures, or a subset thereof including operation system 416, network communication module 418, a video module 426 and data 420.

The client device 102 includes a video input/output 430 for receiving and outputting video streams. In some implementations, the video input/output 430 is configured to receive video streams from radio transmissions, satellite transmissions and cable lines. In some implementations the video input/output 430 is connected to a set top box. In some implementations, the video input/output 430 is connected to a satellite dish. In some implementations, the video input/output 430 is connected to an antenna.

In some implementations, the client device 102 includes a television tuner 432 for receiving video streams or TV signals.

The operating system 416 includes procedures for handling various basic system services and for performing hardware dependent tasks.

The network communication module 418 facilitates communication with other devices via the one or more communication network interfaces 404 (wired or wireless) and one or more communication networks, such as the Internet, other wide area networks, local area networks, metropolitan area networks, and so on.

The data 420 includes video streams 161.

The video module 426 derives content information 164 from a video stream 161. In some implementations, the content information 161 includes individually discernable text segments 324, one or more images 326, a user identifier 329 or any combination thereof. The user identifier 329 identifies a user of the client device 102. For example, the user identifier 329 can be an IP address associated with a client device 102 or an alphanumeric value chosen by the user or assigned by the server that uniquely identifies the user. In some implementations, the individually discernable text segments 324 include text (e.g. phrases, sentences, paragraphs, etc.) associated with a video stream or audio stream, such as excerpts from a TV sitcom or movie script, or the closed caption data. In some implementations, the images 326 include at least one still image or a clip (such as several seconds, minutes, or hours) associated with a video stream that was played on the client device 102. In some implementations, the images 326 and text segments 324 are derived from a video stream 161 that is playing or was played on the client 102. For example, the video module 426 may generate several sets of content information 164 for a respective video stream 161.

Each of the above identified elements may be stored in one or more of the previously mentioned memory devices, and each of the modules or programs corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 406 may store additional modules and data structures not described above.

Although FIG. 4A shows a client device, FIG. 4A is intended more as functional description of the various features which may be present in a client device than as a structural schematic of the implementations described herein. In practice, and as recognized by those of ordinary skill in the art, items shown separately could be combined and some items could be separated.

Figure 4B:
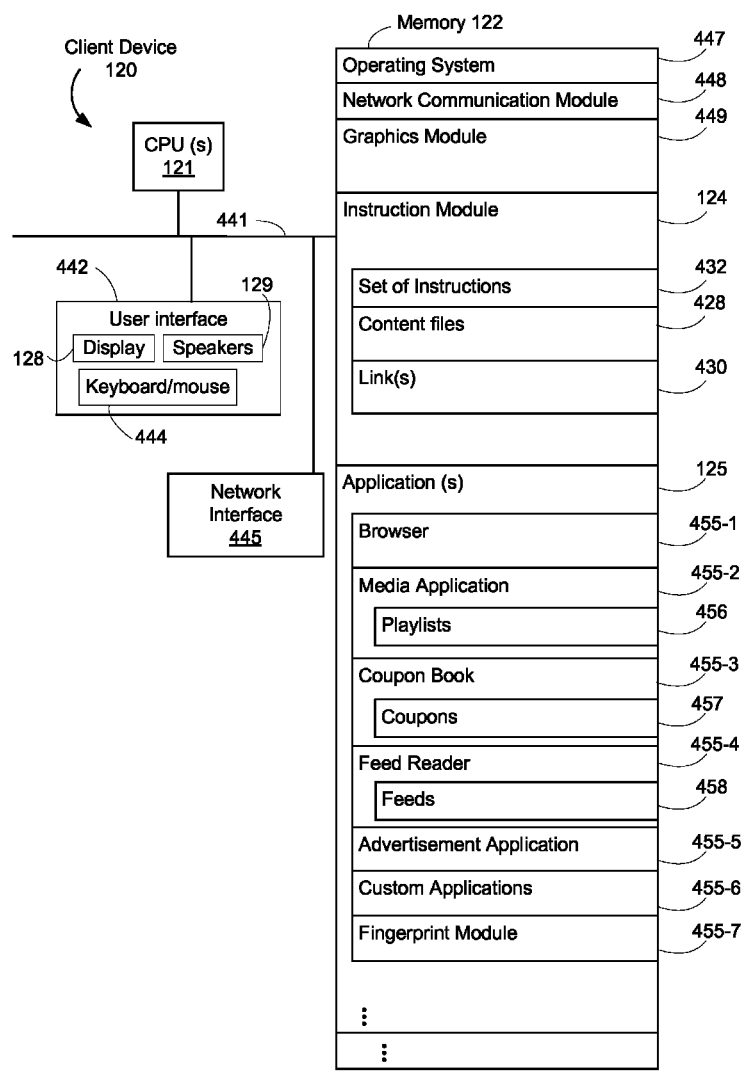
FIG. 4B is a block diagram of a configuration of another client device according to some implementations.

FIG. 4B is a block diagram of a configuration of a second screen client device 120, in accordance with some implementations. The second screen client device 120 typically includes one or more processing units (CPU's) 121, one or more network or other communications interfaces 445, memory 122, and one or more communication buses 441, for interconnecting these and various other components. The communication buses 441 optionally include circuitry (sometimes called a chipset) that interconnects and controls communications between system components. The second screen client device 120 may also include a user interface comprising a display device 128, speakers 129 and a keyboard and/or mouse (or other pointing device) 444. Memory 122 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 122 may optionally include one or more storage devices remotely located from the CPU(s) 121. Memory 122, or alternatively the non-volatile memory device(s) within memory 122, comprises a non-transitory computer readable storage medium. In some implementations, memory 122 or the computer readable storage medium of memory 122 store the following programs, modules and data structures, or a subset thereof including operation system 447, network communication module 448, graphics module 449, a instruction module 124 and applications 125.

The operating system 447 includes procedures for handling various basic system services and for performing hardware dependent tasks.

The network communication module 448 facilitates communication with other devices via the one or more communication network interfaces 445 (wired or wireless) and one or more communication networks, such as the Internet, other wide area networks, local area networks, metropolitan area networks, and so on.

The instruction module 124 receives a set of instructions 432 and optionally content files 428 and/or links to content files 430. The instruction module 124 executes the set of instructions 432. In some implementations, the instruction module 124 executes an application 125 in accordance with the set of instructions 432. For example, in some implementations, the instruction module 124 executes a web browser 455-1 which displays a web page in accordance with the set of instructions 432. In some implementations, the instruction module 124 displays the contents of one or more content files 428. For example, in some implementations, the instruction module 124 may display an advertisement. In some implementations, the instruction module 124 retrieves one or more content files referenced in the links 430.

The second screen client device 120 includes one or more applications 125. In some implementations, the applications 125 include a browser application 455-1, a media application 455-2, a coupon book application 455-3, a feed reader application 455-4, an advertisement application 455-5, custom applications 455-6 and a fingerprint module 455-7. The browser application 455-1 displays web pages or remote services. The media application 455-2 plays videos and music, displays images and manages playlists 456. The feed reader application 355-4 displays content feeds 458. The coupon book application 455-3 stores and retrieves coupons 457. The advertisement application 455-5 displays advertisements. The custom applications 455-6 display information from a website in a format that is easily viewable on a mobile device. The applications 125 are not limited to the applications discussed above.

Each of the above identified elements may be stored in one or more of the previously mentioned memory devices, and each of the modules or programs corresponds to a set of instructions for performing a function described above. The set of instructions can be executed by one or more processors (e.g., the CPUs 121). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 4B shows a client device, FIG. 4B is intended more as functional description of the various features which may be present in a client device than as a structural schematic of the implementations described herein. In practice, and as recognized by those of ordinary skill in the art, items shown separately could be combined and some items could be separated.

Figure 5:
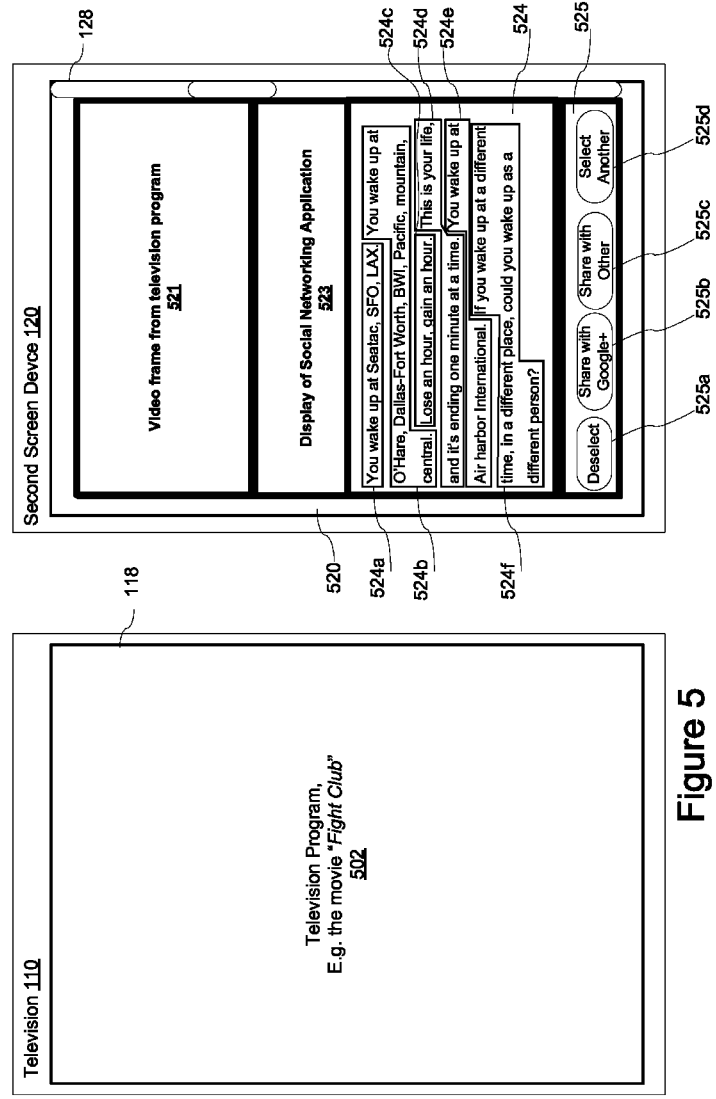
FIG. 5 is a schematic diagram of example screenshots according to some implementations.

With continued reference to FIGS. 1 and 2, FIG. 5 is a schematic diagram of example screenshots of the TV 110 and the second screen client device 120 according to some implementations. The display 118 of the TV 110 displays a television program 502, for example, the movie "Fight Club" aired by a television network. While a TV is illustrated, those skilled in the art will appreciate from the present disclosure that the systems and methods disclosed herein may be used in combination with any media presentation device. The display 128 of the second screen client device 120 displays a user interface 520 of the application 125 for acquiring, selecting and sharing content elements associated with the television program 502.

As described above, while the television program 502 is playing on the TV 110, the second screen client device 120 acquires and/or generates a reference derived from the television program 502. For example, a reference may include a fingerprint, content identifier and/or time-stamp associated with the television program 502. The second screen client device 120 then transmits the reference to the extraction and sharing server 130. The extraction and sharing server 130 matches the content information to a content fingerprint in order to identify the television program 502. After identifying a content fingerprint that matches the content information, the extraction and sharing server 130 generates and/or retrieves a set of instructions and content elements associated with the television program 502, and transmits the set of instructions and the associated content elements to the second screen client device 120 for execution and display. In some implementations, the extraction and sharing server 130 also generates instructions and/or markers that indicate that the content elements may be displayed in respective overlay regions that are separate from one another. In some implementations, the extraction and sharing server 130 generates the overlay regions and pairs the overlay regions with particular content elements, so that the second screen client device 120 displays the overlay regions and content elements as instructed by the extraction and sharing server 130.

The second client device 120 executes the set of instructions, which includes instructions for displaying the received content associated with the television program 502 playing on the TV 110 within the user interface 520. In some implementations, the user interface 520 is configured to include four sections 521, 523, 524, 525. While four sections are included in the example implementation described with reference to FIG. 5, those skilled in the art will appreciate that a fewer or a greater number of sections may be included in a user interface according to various other implementations.

In some implementations, the first section 521 is configured to display an image associated with the television program 502 in order to indicate to the user that the user interface 520 is displaying content specifically associated with the television program 502. For example, the first section 521 may display a recent frame from the television program, which may be updated periodically (e.g. every 5-10 secs). Additionally and/or alternatively, the first section 521 may display a logo and/or a promotional image associated with either the television program or the logo of a broadcast station (i.e. the logo of the television channel, station or network) that is airing the television program 502.

In some implementations, the second section 523 is configured to display a user interface of the social networking application the user employs to share content elements associated with the television program 502. In some implementations, the second section 523 may include a web-browser, email client application, a micro-blog client application, or an SMS client application, etc., associated with the social networking application. In some implementations, the second section 523 may display user interfaces for two or more social networking applications.

In some implementations, the third section 524 is configured to display individually selectable content elements within non-intersecting overlay regions that enable less cumbersome selection of individual content elements. For example only, as illustrated in FIG. 5, the third section 524 includes six text segments (i.e. one type of content element) that are made individually selectable by a corresponding six overlay regions 524a, 524b, 524c, 524d, 524e, 524f. Each overlay region 524a, 524b, 524c, 524d, 524e, 524f includes one sentence or phrase quoted from the movie Fight Club. However, each individually selectable text segment may include either as little as a single character or an indefinitely long character string in free form or forming multiple sentences and paragraphs. Additionally, while text segments have been used as examples of content elements, those skilled in the art will appreciate that various other types of content elements may be included, such as for example, and without limitation, images, video clips, links to audio files, etc.

In some implementations, the respective overlay regions are not visible to the user, whereas in other implementations the overlay regions are visible. In some implementations, a respective overlay region only becomes visible once a user has attempted to select the text or content element associated with that overlay region (or vice versa). In such cases, the overlay region may, for example, appear as a highlight, bubble or box around the selected content item. In some implementations, one or more of the overlay regions is visible without first being selected, but once such an overlay region is selected by a user, the display of that overlay region changes. For example, the overlay region may change color once selected. That is, in some implementations, indicating that the respective text segment has been selected includes changing appearance of at least one of the corresponding overlay region and the text.

In some implementations, in response to sensing a user contact with the touch-screen display in association with an overlay region, when the appearance of the overlay region shows that the respective displayed text segment is selected, toggling the appearance of the overlay region to show that the respective displayed text segment is no longer selected. In some implementations, an overlay region is at least one of visually the same as the background against which the one or more text segments are displayed, and visually different as compared to the background against which the one or more text segments are displayed.

In some implementations, the fourth section 525 is configured to display a number of selectable commands associated with acquiring, selecting and sharing content elements. In some implementations, each selectable command is displayed in an icon or button or the like. For example, as illustrated in FIG. 5, the fourth section 525 includes four selectable command buttons 525a ("Deselect"), 525b ("Share with Google+"), 525c ("Share with Other"), 525d ("Select Another"). In some implementations, the selectable commands are commands that have historically been or are expected to be frequently chosen by a significant number of users using the application. In some implementations, the fourth section 525 is configured to allow a user to select one or more of the selectable commands by at least one of using a peripheral device, such as a mouse or keyboard, and/or by touching the display 128 if it is enabled as a touch-screen display.

In some implementations, the user interface 520 may be configured to receive user inputs using a keyboard or virtual displayed keyboard on a touch-screen display. In some implementations, a user can enter new inputs that are not present among the selectable commands displayed.

In some implementations, the application 125 is configured to generate a data structure for each input provided by a user. For example, in addition to a field for the command input, the data structure includes, for example, fields for a stream identifier, a wall clock time, a content time, one or more content elements and a location indicator. In some implementations, the stream identifier field includes a value that identifies the television program 502 playing on the TV 110. In some implementations, the wall clock time field includes a value indicative of the local time where the user is located (e.g. Pacific Standard Time in California, USA). In some implementations, content time field includes a value indicative of a time offset relative to the beginning of the television program 502. In some implementations, the location indicator field includes a value that is indicative of the user location (e.g. Palo Alto, Calif., USA).

While various non-limiting options have been described, those skilled in the art will appreciate from the present disclosure that various other options are also possible.

Figure 6:
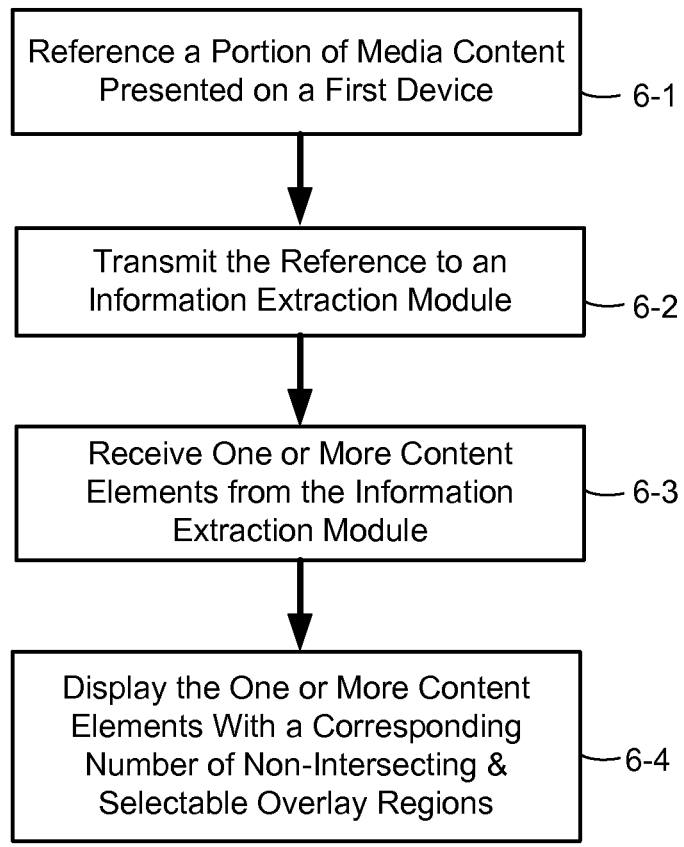
FIG. 6 is a flowchart representation of a method according to some implementations.

FIG. 6 is a flowchart representation of a method according to some implementations. In some implementations, the method is performed by a second screen device (e.g. second screen client device 120 of FIG. 1) in order to acquire and display content elements associated with media content presented on a first device (e.g. TV 110 or computer having a display, etc.). As represented by block 6-1, the method includes the second screen device generating a reference to a portion of media content playing on a first device, such as a television. A reference may include, without limitation, fingerprints of the stored audio content, the audio content itself, portions/snippets of the audio content, fingerprints of the portions of the audio content, an audio recording of the playing media content, a video recording of the playing media content, and/or characteristic extracted from one of an audio or video recording of the playing media content. As represented by block 6-2, the method includes transmitting the reference to the portion of the media content to an information extraction module, which in some implementations is provided by a server system separate from the second screen device. As represented by block 6-3, the method includes receiving from the information extraction module one or more content elements (e.g. text segments or images) associated with the playing media content. As represented by block 6-4, the method includes displaying the one or more content elements with a corresponding number of non-intersecting and individually selectable overlay regions.

As noted above, the overlay regions (e.g. overlay regions 524a, 524b, 524c, 524d, 524e, 524f shown in FIG. 5) enable less cumbersome selection of respective content elements. For example, as opposed to trying to precisely highlight text by sliding a finger across a desired portion of the displayed text, a user can select an entire sentence (or some other meaning amount of text) by merely tapping a touch screen display or using a mouse click on the respective overlay region including the desired portion of text.

Figure 7:
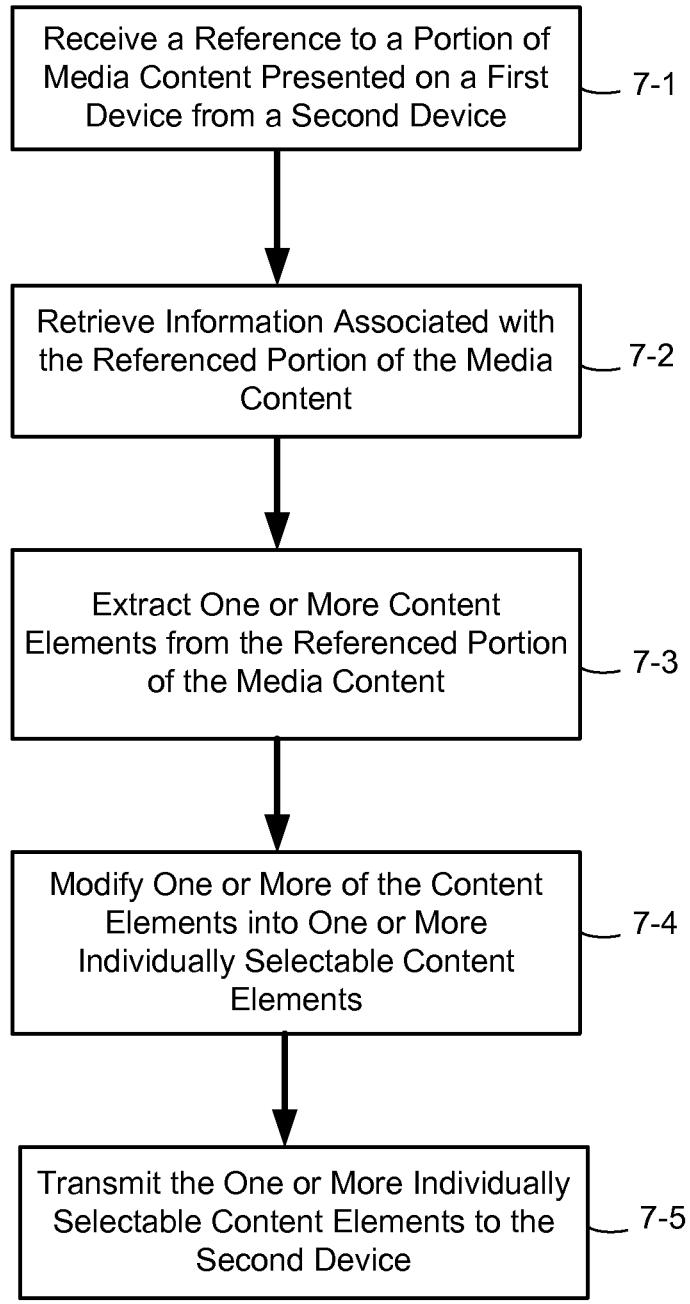
FIG. 7 is a schematic diagram of example screenshots according to some implementations.

FIG. 7 is a flowchart representation of a method according to some implementations. In some implementations, the method is performed by an extraction and sharing server (e.g. content information extraction module 131 of FIG. 1) in order to deliver individually selectable content elements extracted from media content in response to receiving a request from a client device. As represented by block 7-1, the method includes receiving a reference to a portion of media content presented on a first device (e.g. TV 110 of FIG. 2) from a second device (e.g. second screen client device 120 of FIG. 2). As represented by block 7-2, the method includes retrieving information associated the referenced portion of media content (e.g. from content database 136 and fingerprint database 132). As represented by block 7-3, the method includes extracting one or more content elements from the referenced portion of the media content (e.g. from content database 136). As represented by block 7-4, the method includes modifying one or more of the content elements into one or more individually selectable content elements. For example, particular content elements may be grouped according to their relation to one another or disaggregated to allow components of a particular content element to be selected individually. As represented by block 7-5, the method includes transmitting the one or more individually selectable content elements to the second device that sent the reference to the portion of the media content. In some implementations, the method also optionally includes generating and transmitting instructions for the display of the one or more individually selectable content elements. In some implementations, the set of instructions includes indicators that indicate that the one or more content elements either can be displayed individually using non-intersecting overlay regions that enable each respective content element to be individually selectable, or can be displayed as individually selectable groupings including one or more content elements. In some implementations, such instructions are not provided because the extraction and sharing server assumes that the client devices are preprogrammed to display the one or more content elements using corresponding non-intersecting and individually selectable overlay regions.

Figure 8A:
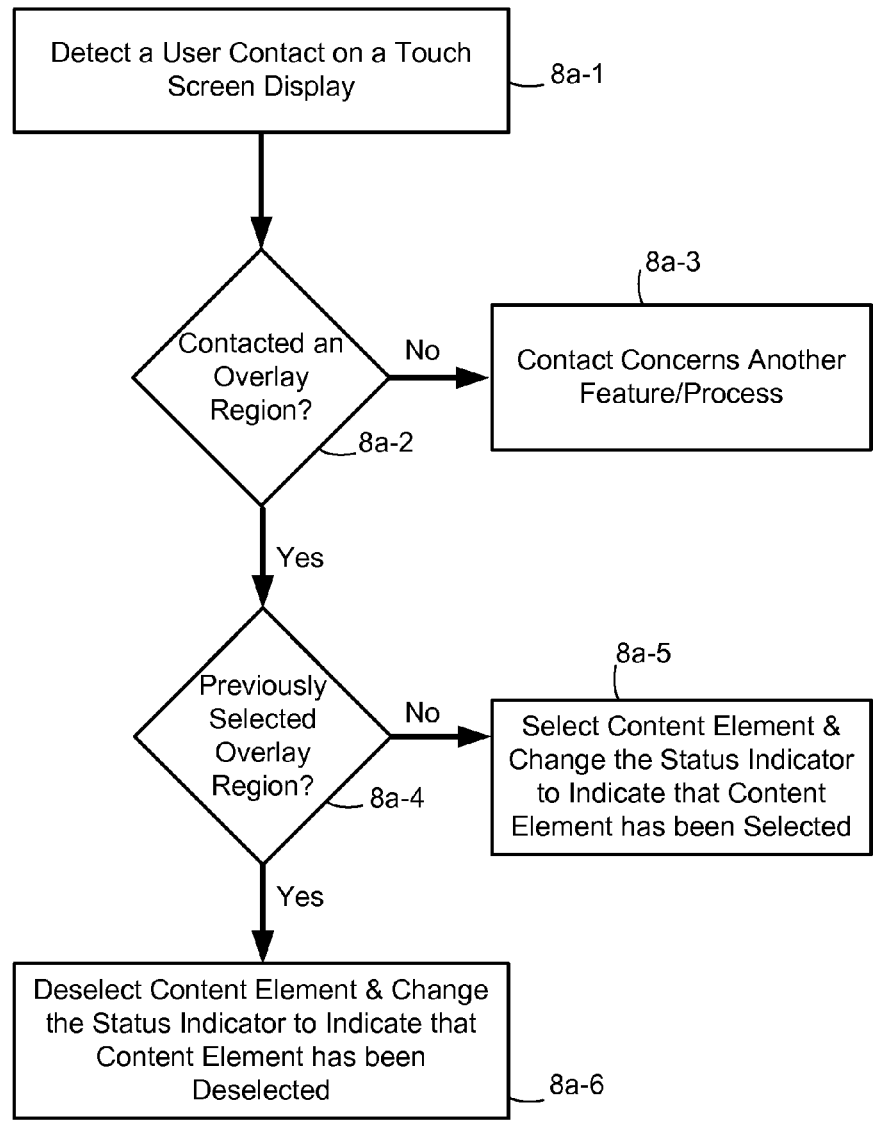
FIG. 8A is a flowchart representation of a method according to some implementations.

FIG. 8A is a flowchart representation of a method according to some implementations. In some implementations, the method is performed by a second screen device (e.g. second screen client device 120 of FIG. 5) to manage the selection of one or more displayed content elements. As represented by block 8a-1, the method includes detecting a user contact on a touch screen display. As represented by block 8a-2, the method includes determining whether or not the user contacted a portion of the display corresponding to an overlay region (e.g. overlay region 524d of FIG. 5). If the user did not contact a portion of the display where a respective overlay region is displayed ("No" path from block 8a-2), as represented by block 8a-3, the method includes determining that the user contact concerns another feature or process available through the second screen device. On the other hand, if the user did contact a portion of the display where a respective overlay region is displayed ("Yes" path from block 8a-2), as represented by block 8a-4, the method includes determining whether or not the contacted overlay region corresponds to a previously selected overlay region.

If the contacted overlay region does not correspond to a previously selected overlay region ("No" path from block 8a-4), as represented by block 8a-5, the method includes selecting the content element of the respective overlay region and changing a status indicator to indicate that the content element and the respective overlay region have been selected. On the other hand, if the contacted overlay region corresponds to a previously selected overlay region ("Yes" path from block 8a-4), as represented by block 8a-6, the method includes deselecting the content element of the respective overlay region and changing a status indicator to indicate that the content element and the respective overlay region have been deselected.

As noted above, with reference to FIG. 5, in some implementations the respective overlay regions are not visible to the user, whereas in other implementations the overlay regions are visible. In some implementations, a respective overlay region only becomes visible once a user has attempted to select the text or content element associated with that overlay region (or vice versa) by contacting the portion of the display where the overlay region is displayed. In such cases, the overlay region may appear as a highlight, bubble or box around the selected content item. In some implementations, one or more of the overlay regions is visible without first being selected, but once such an overlay region is selected by a user, the display of that overlay region changes. For example, the overlay region may change color once selected. That is, in some implementations, indicating that the respective text segment has been selected includes changing appearance of at least one of the corresponding overlay region and the text.

In some implementations, in response to sensing of a user contact with the touch-screen display in association with an overlay region, when the appearance of the overlay region shows that the respective displayed text segment is selected, toggling the appearance of the overlay region to show that the respective displayed text segment is no longer selected. In some implementations, an overlay region is at least one of visually the same as the background against which the one or more text segments are displayed, and visually different as compared to the background against which the one or more text segments are displayed.

Figure 8B:
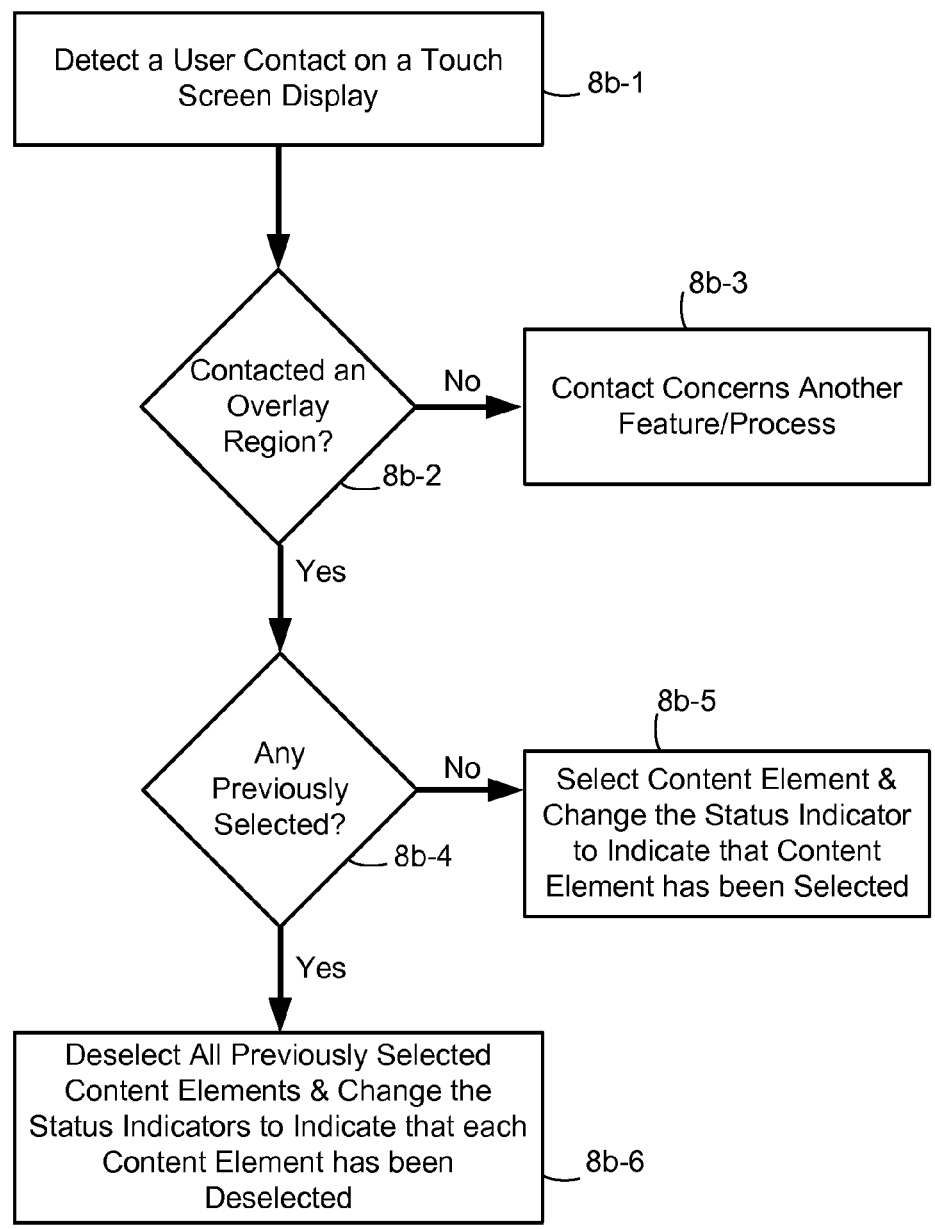
FIG. 8B is a flowchart representation of a method according to some implementations.

FIG. 8B is a flowchart representation of a method according to some implementations. In some implementations, the method is performed by a second screen device (e.g. second screen client device 120 of FIG. 5) to manage the selection of one or more displayed content elements. As represented by block 8b-1, the method includes detecting a user contact on a touch screen display. As represented by block 8b-2, the method includes determining whether or not the user contacted a portion of the display corresponding to an overlay region (e.g. overlay region 524d of FIG. 5). If the user did not contact a portion of the display where a respective overlay region is displayed ("No" path from block 8b-2), as represented by block 8b-3, the method includes determining that the user contact concerns another feature or process available through the second screen device. On the other hand, if the user did contact a portion of the display where a respective overlay region is displayed ("Yes" path from block 8b-2), as represented by block 8b-4, the method includes determining whether or not there are any previously selected content elements.

If are no previously selected content elements ("No" path from block 8b-4), as represented by block 8b-5, the method includes selecting the content element of the respective overlay region and changing a status indicator to indicate that the content element and the respective overlay region have been selected. On the other hand, if there are any previously selected content elements ("Yes" path from block 8b-4), as represented by block 8b-6, the method includes deselecting all of the previously selected content elements and changing the respective status indicators to indicate that the content elements and the respective overlay regions have been deselected.

While the flowcharts provided in FIGS. 8A and 8B, depict specific implementations of methods of managing the selection of one or more displayed content elements, those skilled in the art will appreciate that these methods are merely illustrative. Other methods using, for example, "CTRL-select" or "Shift-select" operations for selecting two or more content elements at a time are would be apparent to those skilled in the art upon reviewing the present disclosure. Other examples includes swiping a finger across multiple items displayed on a touch-screen to select the respective multiple items as a group.

Figure 9:
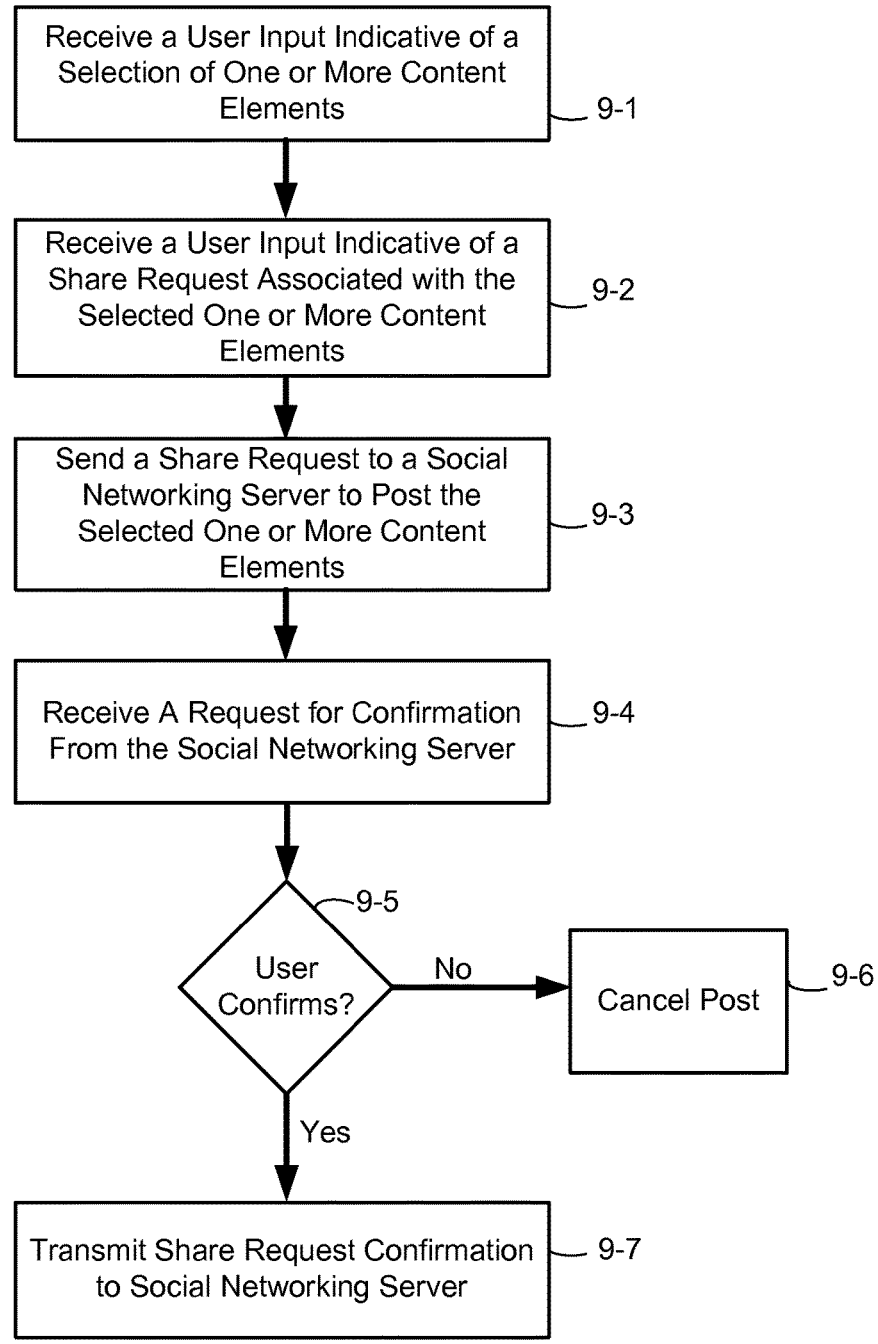
FIG. 9 is a flowchart representation of a method according to some implementations.

FIG. 9 is a flowchart representation of a method according to some implementations. In some implementations, the method is performed by a second screen device (e.g. second screen client device 120 of FIG. 1) to share content elements extracted from media content presented on a first device (e.g. TV 110 of FIG. 2). As represented by block 9-1, the method includes receiving a user input indicative of a selection of one or more content elements. As represented by block 9-2, the method includes receiving a user input indicative of a share request associated with one or more selected content elements. With further reference to block 9-1 and 9-2, for example and without limitation, in some implementations receiving a user input includes sensing a contact with a touch-screen, receiving an input from a keyboard, mouse or other peripheral device, and receiving a voice command from a microphone, etc.

As represented by block 9-3, the method includes sending a share request to a social networking server to post one or more selected content elements to an account associated with the user. In some implementations, the method includes enabling a user to select one or more social networks on which to share a particular content element. For example, with further reference to FIGS. 2 and 5, the user 221 may want to post the quote from the movie Fight Club associated with overlay region 524d to his social networking or microblog account so that he can share the quote with his friends and acquaintances. In some implementations, the client device copies the quote corresponding to overlay region 524d from third section 524 into a data structure that is transmitted to the social networking server. In some implementations, the client device includes at least a pointer to the quote corresponding to overlay region 524d from third section 524 into a data structure that is transmitted to the social networking server. As represented by block 9-4, the method includes receiving a request for confirmation or authentication from the social networking server.

As represented by block 9-5, the method includes determining whether or not the user provides an input to confirm (or authenticate) the post. If the user fails to provide an input indicative of a confirmation or provides an input indicative declining the confirmation the post ("No" path from block 9-5), as represented by block 9-6 the method includes aborting the post. In some implementations, aborting the post includes either taking no further action or sending a message to the social networking server declining the confirmation. On the other hand, if the user provides confirmation or authentication data ("Yes" path from block 9-5), as represented by block 9-7, the method includes transmitting the share request confirmation to the social networking server.

While the flowchart of FIG. 9 is illustrative of a method of posting or sharing content in which the client device communicates directly with the social networking server, those skilled in the art will appreciate from the present disclosure that posting or sharing content can also be managed by the extraction and sharing server. The flowchart provided in FIG. 10 is illustrative of such a method.

Figure 10:
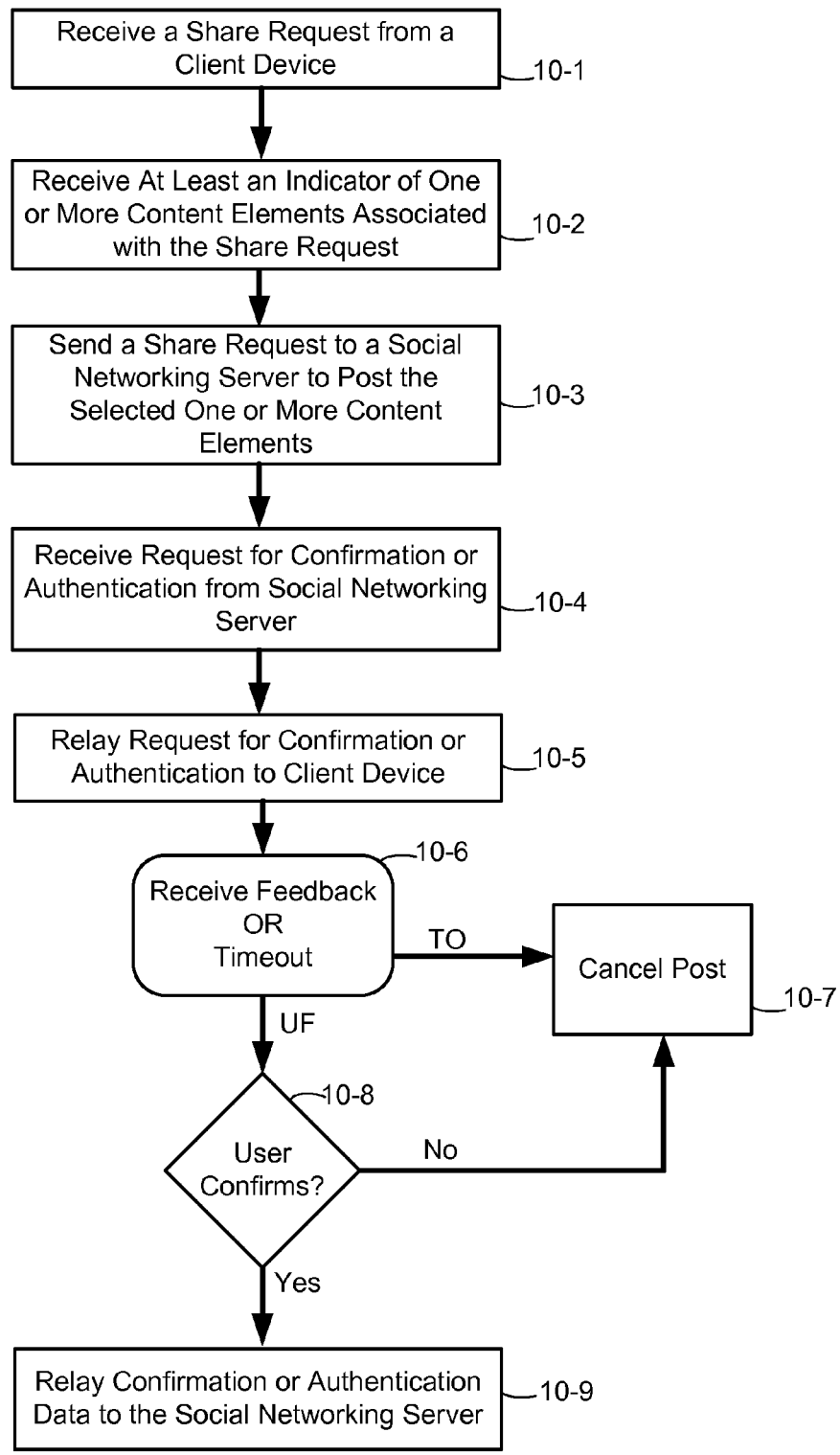
FIG. 10 is a flowchart representation of a method according to some implementations.

FIG. 10 is a flowchart representation of a method according to some implementations. In some implementations, the method is performed by an extraction and sharing server (e.g. content information extraction module 131 of FIG. 1) to manage sharing of content elements extracted from media content. As represented by block 10-1, the method includes receiving a share request from a client device (e.g. second screen client device 120 of FIG. 1). As represented by block 10-2, the method includes receiving at least an indicator of one or more content elements associated with the share request. As represented by block 10-3, the method includes sending a share request to a social networking server to post one or more selected content elements to using an account associated with the user of the client device. As represented by block 10-4, the method includes receiving a request for confirmation or authentication from the social networking server. As represented by block 10-5, the method includes relaying the request for confirmation or authentication to the client device.

As represented by block 10-6, the method includes receiving feedback from the client device within a timeframe or declaring a timeout condition indicating that the user of the client device has not responded within a reasonable amount of time. If the timeout condition is declared ("TO" path from block 10-6), as represented by block 10-7, the method includes aborting the post. On the other hand, if user feedback is received from the client device ("UF" path from block 10-6), as represented by block 10-8, the method includes determining whether or not the user provided an input to confirm (or authenticate) the post. If the user provided an input indicative declining the confirmation the post ("No" path from block 10-8), as represented by block 10-7 the method includes aborting the post. In some implementations, aborting the post includes either taking no further action or relaying the message to the social networking server declining the confirmation provided from the client device. On the other hand, if the user provides confirmation or authentication data ("Yes" path from block 10-8), as represented by block 10-9, the method includes relaying the share request confirmation to the social networking server from the client device.

Figure 11:
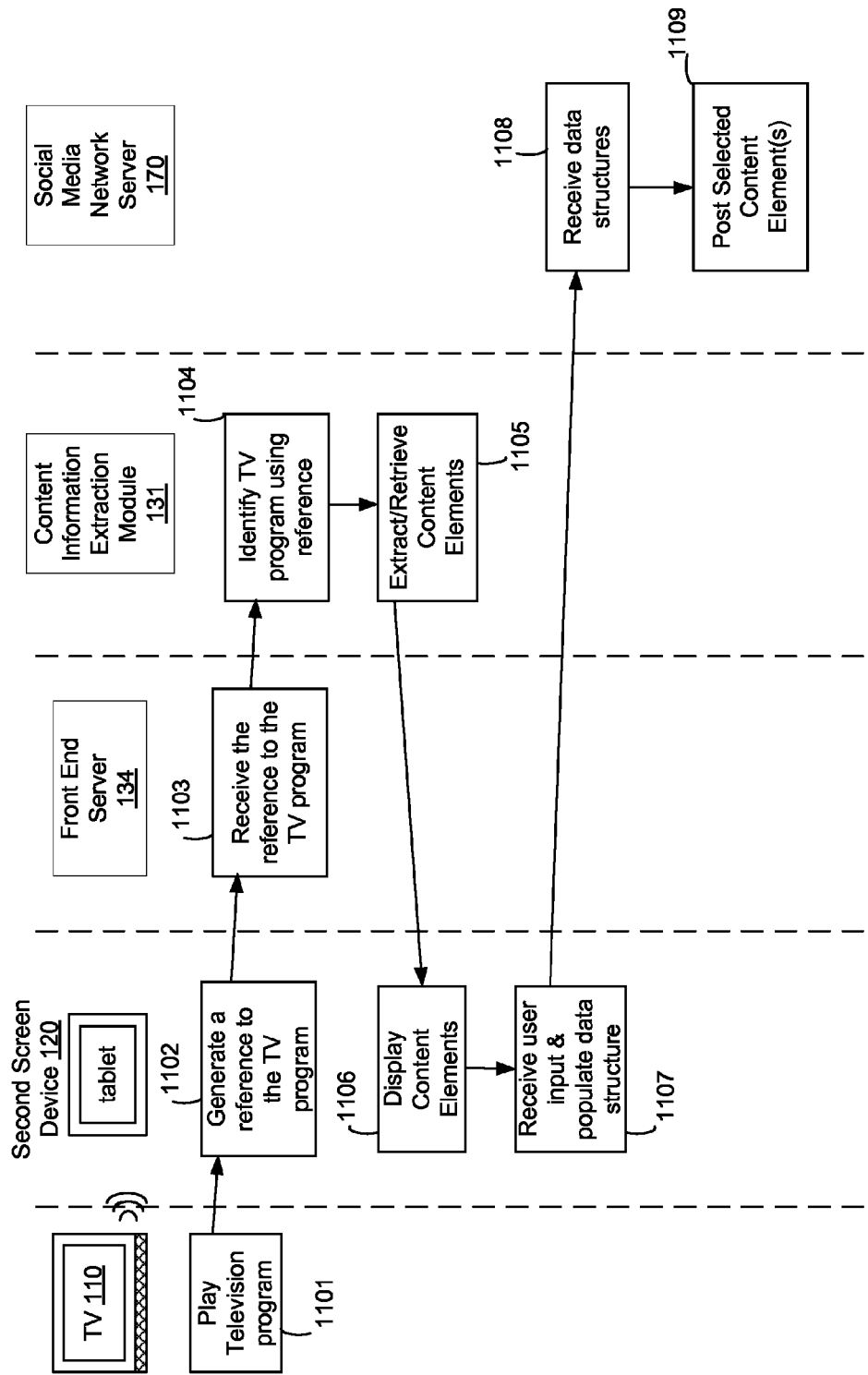
FIG. 11 is a signaling diagram representation of some of the transmissions between devices according to some implementations.

With further reference to FIG. 1, FIG. 11 is a signaling diagram representation of some of the transmissions between components in the client-server environment 100. As represented by block 1101, the TV 110 plays a television program, such as, without limitation, a drama, a political debate, the nightly news, or a sporting event. Playing a television program includes displaying video on a display and outputting audio using speakers. As represented by block 1102, second screen client device 120 generates a reference to the TV program playing on the TV 110. To that end, in some implementations, the second screen client device 120 records at least one of audio or video output by the TV 110. In some implementations, the TV 110 and second screen client device 120 or the client device 102 and the second screen client device 120 share data connection that allows the second screen client device 120 to retrieve content associated with the playing television program that can be used to generate the reference. The second screen client device 120 then transmits the reference to the extraction and sharing server 130. As represented by block 1103, the front end server 134 receives the reference from the second screen client device 120. As represented by block 1104, the content information extraction module 131 identifies the TV program by comparing information included in the reference against information in the fingerprint database until a match is found. As represented by block 1105, the content information extraction module 131 the extracts or retrieves one or more content elements to return to the second screen client device 120.

As represented by block 1106, the second screen client device 120 displays the content elements with a corresponding number of non-intersecting overlay regions. As noted above, the overlay regions enable each respective content element to be individually selectable. As represented by block 1107, the second screen client device 120 receives a user input indicating a selection of one or more of the content elements, populates a data structure with the one or more selected content elements, and sends the data structure to the social media network server 170. In some implementations, the data structure is routed through the extraction and sharing server, whereas in other implementations the data structure is not routed through the extraction and sharing server.

As represented by block 1108, the social media network server 170 receives data structures from client devices. As represented by block 1109, the social media network server 170 posts one or more content elements associated with the TV program to accounts associated with respective users requesting such posts.

The foregoing description, for purpose of explanation, has been described with reference to specific implementations. The aspects described above may be implemented in a wide variety of forms, and thus, any specific structure and/or function described herein is merely illustrative. Moreover, the illustrative discussions above are not intended to be exhaustive or to limit the methods and systems to the precise forms disclosed. Many modifications and variations are possible in view of the above teachings. The implementations were chosen and described in order to best explain the principles of the methods and systems and their practical applications, to thereby enable others skilled in the art to best utilize the various implementations with various modifications as are suited to the particular use contemplated.

Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Moreover, in the foregoing description, numerous specific details are set forth to provide a thorough understanding of the present implementation. However, it will be apparent to one of ordinary skill in the art that the methods described herein may be practiced without these particular details. In other instances, methods, procedures, components, and networks that are well known to those of ordinary skill in the art are not described in detail to avoid obscuring aspects of the present implementation.

It will also be understood that, although the terms "first," "second," etc. may be used herein to describe various features, these features are not limited by these terms. These terms are only used to distinguish one element from another. For example, a first device could be termed a second device, and, similarly, a second device could be termed a first device, without changing the meaning of the description, so long as all occurrences of the "first device" are renamed consistently and all occurrences of the "second device" are renamed consistently.

Moreover, the terminology used herein is for the purpose of describing particular implementations and is not intended to be limiting of the claims. As used in the description of the implementations and the claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method of retrieving and displaying individually selectable content elements on a first device including a processor, memory and a display, the method comprising:
    generating a reference to a portion of media content, wherein the media content comprises at least one of a video stream and an audio stream, wherein generating the reference to the portion of the media content includes recording on the first device the referenced portion of the media content from media content playing on a second device separate from the first device;
    transmitting, to a computing device, the reference to the portion of media content;
    receiving, from the computing device, a plurality of text segments associated with the referenced portion of media content, wherein each of the plurality of text segments comprises at least one of a phrase or a sentence from an excerpt of dialog from a script or closed captioning data corresponding to a portion of the audio stream;
    outputting, for display, the plurality of text segments on the display in combination with a corresponding plurality of non-intersecting and individually selectable overlay regions, wherein each of the respective overlay regions enable individual selection of a corresponding one of the plurality of text segments;
    outputting, for contemporaneous display with the plurality of non-intersecting and individually selectable overlay regions corresponding to the plurality of text segments, a user-selectable button for sharing content elements;
    receiving an indication of a selection of one or more individually selectable overlay regions corresponding to the plurality of displayed text segments;
    receiving an indication of a share request to share the displayed text segments associated with the selected one or more individually selectable overlay regions, the share request comprising a selection of the button for sharing content elements, the share request associated with a social networking service; and
    transmitting the share request to a server configured for posting the displayed text segments associated with the selected one or more individually selectable overlay regions to the social networking service.

2. The method of claim 1, wherein the display includes a touch-screen display, and the method further comprises enabling user interaction with the touch-screen display to allow a user to individually select a respective text segment by touching a portion of the touch-screen display displaying both the respective text segment and the corresponding individually selectable overlay region.

3. The method of claim 2 further comprising:
    sensing a touch on a particular portion of the touch-screen display, wherein the particular portion of the touch-screen display corresponds to an individually selectable overlay region displayed on the particular portion of the touch-screen display;
    responsive to sensing the touch, selecting a particular displayed text segment associated with the corresponding individually selectable overlay region displayed on the particular portion of the touch-screen display; and
    indicating that a respective text segment has been selected.

4. The method of claim 2, further comprising:
    in response to the sensing of a user contact with the touch-screen display in association with an individually selectable overlay region, when the appearance of the individually selectable overlay region shows that the respective displayed text segment is selected, toggling the appearance of the individually selectable overlay region to show that the respective displayed text segment is no longer selected.

5. The method of claim 1, further comprising:
    recording an audio soundtrack of a live media program to create a recorded audio soundtrack; and
    sending, to the computing device, audio content derived from the recorded audio soundtrack to enable the computing device to determine from among a plurality of live media program transmissions a particular live media program by matching the received audio content to audio soundtracks of live media program transmissions.

6. A non-transitory computer readable storage medium storing at least one program configured for execution by at least one processor of a computer system including at least one processor, memory and a display, the at least one program comprises instructions that when executed cause the computer system to:
    generate a reference to a portion of media content, wherein the media content comprises at least one of a video stream and an audio stream, wherein the reference to the portion of the media content is generated at least in part by recording on the first device the referenced portion of the media content from media content playing on a second device separate from the first device;
    transmit, to a computing device, the reference to the portion of media content;
    receive, from the computing device, a plurality of text segments associated with the referenced portion of media content, wherein each of the plurality of text segments comprises at least one of a phrase or sentence from an excerpt of dialog from a script or closed captioning data corresponding to a portion of the audio stream;
    output, for display, the plurality of text segments on the display in combination with a corresponding plurality of non-intersecting and individually selectable overlay regions, wherein each of the respective overlay regions enable individual selection of a corresponding one of the plurality of text segments;

output, for contemporaneous display with the plurality of non-intersecting and individually selectable overlay regions corresponding to the plurality of text segments, a user-selectable button for sharing content elements;

receive an indication of a selection of one or more individually selectable overlay regions corresponding to the plurality of displayed text segments;

receive an indication of a share request to share the displayed text segments associated with the selected one or more individually selectable overlay regions, the share request comprising a selection of the button for sharing content elements, the share request associated with a social networking service; and transmit the share request to a server configured for posting the displayed text segments associated with the selected one or more individually selectable overlay regions to the social networking service.

\* \* \* \* \*